US010990845B2

(12) United States Patent
Boutant et al.

(10) Patent No.: US 10,990,845 B2
(45) Date of Patent: Apr. 27, 2021

(54) METHOD OF AUGMENTED AUTHENTIFICATION OF A MATERIAL SUBJECT

(71) Applicant: KERQUEST, Chindrieux (FR)

(72) Inventors: Yann Boutant, Chindrieux (FR); Thierry Fournel, Saint-Galmier (FR)

(73) Assignee: KERQUEST, Chindrieux (FR)

( * ) Notice: Subject to any disclaimer, the term of this patent is extended or adjusted under 35 U.S.C. 154(b) by 44 days.

(21) Appl. No.: 16/302,255

(22) PCT Filed: May 17, 2017

(86) PCT No.: PCT/FR2017/051196
§ 371 (c)(1),
(2) Date: Nov. 16, 2018

(87) PCT Pub. No.: WO2017/198950
PCT Pub. Date: Nov. 23, 2017

(65) Prior Publication Data
US 2019/0279029 A1    Sep. 12, 2019

(30) Foreign Application Priority Data

May 17, 2016   (FR) ...................................... 1654385
Jul. 13, 2016   (FR) ...................................... 1656796

(51) Int. Cl.
*G06K 9/00*    (2006.01)
*G06K 9/62*    (2006.01)
*H04N 1/32*    (2006.01)

(52) U.S. Cl.
CPC ......... *G06K 9/6215* (2013.01); *G06K 9/6212* (2013.01); *H04N 1/32144* (2013.01); *G06K 2009/6213* (2013.01)

(58) Field of Classification Search
CPC ............... G06K 9/6215; G06K 9/6212; G06K 2009/6213; H04N 1/32144
(Continued)

(56) References Cited

U.S. PATENT DOCUMENTS

2005/0100219 A1* 5/2005 Berkner .............. G06F 16/5838
382/190
2009/0060348 A1* 3/2009 Monro ............... G06K 9/00617
382/209
(Continued)

OTHER PUBLICATIONS

Wan-Lei Zhao Et Al: "Scale-Rotation Invariant Pattern Entropy for Keypoint-Based Near-Duplicate Detection", IEEE Transactions on Image Processing, IEEE Service Center, Piscataway, NJ, US, vol. 17, No. 2, Feb. 2009 (Feb. 1, 2009), pp. 412-423. (Year: 2009).*
(Continued)

*Primary Examiner* — Van D Huynh
(74) *Attorney, Agent, or Firm* — Nixon & Vanderhye

(57) ABSTRACT

Disclosed is a method for determining a relational imprint between two images including the following steps: —the implementation of a first image and of a second image, —a phase of calculating vectors of similarity between tiles belonging respectively to the first and second images, the similarity vectors forming a field of imprint vectors, the field of imprint vectors including at least one haphazard region disordered in the sense of an entropy criterion, —a phase of recording in the guise of relational imprint of a representation of the calculated field of imprint vectors. Also disclosed is a method for authenticating a candidate image with respect to an authentic image implementing the method for determining a relational imprint.

32 Claims, 14 Drawing Sheets

1-B

1-A

1-C

1-D

1-E

(58) Field of Classification Search
USPC .......................................................... 382/209
See application file for complete search history.

(56) References Cited

U.S. PATENT DOCUMENTS

2011/0273728 A1* 11/2011 Sasaki .................. G06K 15/005
358/1.2
2016/0267353 A1* 9/2016 Kwak ................ G06K 9/00744

OTHER PUBLICATIONS

Chong-Wah Ngo Et Al: "Fast tracking of near-duplicate keyframes in broadcast domain with transitivity propagation", ACM Multimedia 2006 & Co-Located Workshops : Oct. 23-27, 2006, Santa Barbara, CA, USA ; MM '06 ; Proceedings, ACM Press, [New York, NY], Oct. 23, 2006 (Oct. 23, 2006), pp. 845-854. (Year: 2006).*
Wan-Lei Zhao et al: "Scale-Rotation Invariant Pattern Entropy for Keypoint-Based Near-Duplicate Detection", IEEE Transactions on Image Processing, IEEE Service Center, Piscataway, NJ, US, vol. 17, No. 2, Feb. 2009 (Feb. 1, 2009), pp. 412-423. (Year: 2009) (Year: 2009).*
Chong-Wah Ngo et al: "Fast tracking of near-duplicate keyframes in broadcast domain with transitivity propagation", ACM Multimedia 2006 & Co-Located Workshops : Oct. 23-27, 2006, Santa Barbara, CA, USA ; MM '06 ; Proceedings, ACM Press, [New York, NY], Oct. 23, 2006, pp. 845-854. (Year: 2006).*
Wan-Lei Zhao et al: "Scale-Rotation Invariant Pattern Entropy for Keypoint-Based Near-Duplicate Detection", IEEE Transactions on Image Processing, IEEE Service Center, Piscataway, NJ, US, vol. 17, No. 2, Feb. 2009 (Feb. 1, 2009), pp. 412-423, XP011249840, ISSN: 1057-7149.
Chong-Wah Ngo et al: "Fast tracking of near-duplicate keyframes in broadcast domain with transitivity propagation", ACM Multimedia 2006 & Co-Located Workshops : Oct. 23-27, 2006, Santa Barbara, Califirnia, USA ; MM '06 ; Proceedings, ACM Press, [New York, NY], Oct. 23, 2006 (Oct. 23, 2006), pp. 845-854, XP058233396, ISBN: 978-1-59593-447-5, DOI: 10.1145/1180639.1180827.
Shyu et al: "Image encryption by multiple random grids", Pattern Recognition, Elsevier, GB, vol. 42, No. 7, Jul. 2009 (Jul. 1, 2009), pp. 1582-1596, XP026026945, ISSN: 0031-3203, [retrieved on Aug. 30, 2008], DOI: 10.1016/J.PATCOG.2008.08.023.
Ran-Zan Wang et al: "Incrementing visual cryptography using random grids", Optics Communications, Elsevier, Amsterdam, NL, vol. 283, No. 21, Jun. 14, 2010 (Jun. 14, 2010), pp. 4242-4249, XP028360620, ISSN: 0030-4018, [retrieved on Jun. 20, 2010], DOI: 10.1016/J.OPTCOM.2010.06.042.
International Search Report, dated Aug. 21, 2017, from corresponding PCT/FR2017/051196 application.

* cited by examiner

1-A

1-B

1-C

1-D

1-E

3-A          3-B

3-C

| U (pixels) | V (pixels) | U (pixels) | V (pixels) | U (pixels) | V (pixels) |
|---|---|---|---|---|---|
| -107,13 | -80,63 | 4,21 | 2,59 | 34,04 | -16,09 |
| -38,22 | -0,91 | 4,68 | 2,58 | 34,86 | -15,67 |
| 63,30 | 25,21 | 6,52 | 1,93 | 35,87 | -14,70 |
| 43,33 | -46,13 | 7,96 | 1,41 | 36,37 | -13,79 |
| 34,80 | -39,59 | 9,54 | 0,77 | 36,59 | -13,45 |
| 2,89 | -90,44 | 10,87 | 0,31 | 37,27 | -13,08 |
| 2,90 | 31,23 | 11,74 | -0,18 | 40,83 | -12,53 |
| 14,14 | -52,76 | 12,58 | -0,74 | 42,10 | -12,69 |
| 0,19 | -46,18 | 13,04 | -1,09 | | |
| 0,34 | -9,36 | 12,99 | -1,30 | | |
| -0,99 | -10,11 | 4,33 | -1,58 | | |
| -24,15 | -20,67 | 14,35 | -2,03 | | |
| -24,92 | -15,98 | 14,78 | -2,31 | | |
| -1,57 | -9,31 | 15,01 | -2,59 | | |
| -61,26 | 30,77 | 4,71 | 2,15 | | |
| -13,30 | 20,86 | 5,86 | 2,09 | | |
| 10,62 | 1,00 | ... | ... | | |
| 36,75 | 24,00 | 14,15 | -2,57 | | |
| -25,25 | 24,47 | 14,14 | -2,63 | | |
| 11,82 | 23,90 | 14,22 | -2,60 | | |
| -6,96 | 43,86 | 14,24 | -2,58 | | |
| -25,16 | 74,70 | | | | |
| -2,03 | -0,58 | | | | |
| 0,93 | 43,83 | | | | |
| 18,01 | -52,90 | | | | |
| ... | ... | | | | |
| -53,49 | 68,24 | | | | |
| 16,91 | 25,23 | | | | |
| -7,64 | 43,64 | | | | |
| 58,00 | 18,26 | | | | |
| 64,92 | -1,62 | | | | |
| -96,86 | 68,24 | | | | |

Disordered class · Regular class top/left · Regular class bottom/right

6-A

6-B

6-C

11-A

11-B

11-C

*12-A*     *12-B*     *12-C*

*12-D*     *12-E*     *12-F*

*12-G*     *12-H*     *12-I*

*12-J*

13-A

13-B

14-A

14-B

15-A

15-B

15-C

16-A

16-B

16-C

16-D

16-E

16-F

17-A

17-B

17-C

17-D

METHOD OF AUGMENTED AUTHENTIFICATION OF A MATERIAL SUBJECT

BACKGROUND OF THE INVENTION

Field of the Invention

The present invention relates to the technical field of authentication and integrity checking of material subjects, as well as the field of visual cryptography. In a preferred but not exclusive application, the invention relates to the field of unitary authentication of material subjects.

Description of the Related Art

Image matching methods are known, intended for object recognition/localization in visual servoing or navigation in robotics, for reconstruction of a same scene from different points of view in stereoscopy, for assembling partially overlapping views in panoramic photography, or also for shape recognition in image searching/image-database indexing. There also exist methods of object tracking over time. However, all these methods search to determine the higher or lesser similarity existing between two images without however allowing an authentication of the images or the subjects from which the images come or of which the images are acquisitions.

Hence, the need arose for a method for relating two images that is able to account for the intrinsic hazard present in one at least of the two images or also to account for the intrinsic hazard present in the two images and to explain it by comparison. That is to say, in particular, a method for relating two images that makes it possible to explain and use the singular variability, at different scales, of attributes such as, in particular, the texture and the contours.

BRIEF SUMMARY OF THE INVENTION

In order to achieve this objective, the invention relates to a method for determining a relational imprint between two images, comprising:
  the implementation of a first and a second image of at least one material subject,
  a phase of calculating vectors of similarity between tiles belonging to the first and second images, respectively, the similarity vectors forming a field of imprint vectors that comprises at least one disordered region in the sense of an entropy criterion,
  a phase of recording as a relational imprint a representation of the field of imprint vectors calculated at the preceding step.

The relational imprint according to the invention may be used in various applications, for example to authenticate, identify, inspect, an image or a material subject after acquisition of an image of the latter.

The invention has for advantage to implement, on the one hand, the properties of unicity, non-reproducibility and unpredictability of the matter coming from a material subject, and uses the relating of images with a view, in particular, to determining a so-called relational imprint of a first image with respect to a second image, one at least of the images being an image of a material subject. From this relational imprint can be derived, via a digital conditioning, a relational signature intended for automatic authentication tasks. From this relational imprint may also be derived, via a cognitive conditioning, a relational stimulus intended to allow an authentication aimed at at least one of the senses of a human user without previous training nor specific material, using the capacity of the latter to gauge or judge the presence and the quality of a phenomenon. That is what we call the "augmented authentication".

In the sense of the invention, a "field of vectors" may be understood as one or several scalar fields, and more generally one or several tensor fields, knowing that a tensor of order 0 is a scalar and a tensor of order 1 is a vector, without changing the spirit of the present invention. Hence, in the sense of the invention, the term "field of vectors" is to be understood as being equivalent to the term "field of tensors", wherein the two terms can be used indifferently, unless otherwise mentioned. A variant of the invention implementing fields of tensor, as the case may be of different orders, for determining a same relational imprint is conceivable, in so far as it is not incompatible with the different characteristics of implementation of the method.

The set of similarity vectors calculated during the phase of calculating vectors of similarity between tiles belonging to the first and second images, respectively, is comparable to at least one field of vectors in that it is theoretically possible to calculate at any point of the reference image one or several similarity vectors, by using at each point and for each similarity vector, a method of calculation defined by a type of similarity indicator and a similarity rank. It is also possible to complete a portion of field that can be calculated by an interpolation or also an extrapolation or also a vectorial function with values fixed a priori, at all the other points of the image of reference to approximate or reconstitute a field in the strict sense.

A field of imprint vectors, in the sense of the invention, is a sampled version of a field of vectors in the strict sense, consisted of one or several fields of similarity vectors, said field(s) being consisted of similarity vectors each calculated at their point of application according to the same method of calculation.

Hence, a field of imprint vectors, in the sense of the invention, may be composed of a field of similarity vectors or a superimposition of fields of similarity vectors. Several fields of similarity vectors may hence be superimposed to form a field of imprint vectors.

By superimposition of fields of similarity vectors, it is meant, for example, at a same point of application, the vectorial sum of their respective similarity vectors, and/or at any application points, the juxtaposition of their respective similarity vectors.

It being understood that, as the case may be, the handling of fields of similarity vectors, exposed hereinabove, echoes point-to-point to the similarity vectors constituting the imprint vector field, and to their individual calculation method of calculation.

Moreover, it may be useful, in certain executions of the invention, to keep the history of the handling operations performed (for each similarity vector, the method of calculation for obtaining it and the potential combinations with other vectors), in particular before finalizing a relational imprint, and classifying the constituents thereof.

The field of imprint vectors comprises, according to the method of the invention, at least one disordered region and, as the case may be, one regular region.

The representation of the field(s) imprint vectors calculated according to the method described comprises, to form the relational imprint, according to the case:
  the set of similarity vectors calculated,
  only a part of the similarity vectors calculated,
  all or part of the vectors resulting from a combination of the similarity vectors calculated.

Moreover, the relational imprint may contain in particular, for each similarity vector considered, its method of calculation and/or its disordered or not character in the sense of an entropy criterion.

According to the method of the invention, the relational imprint is put under a form that is favourable for the performing of functions such as authentication in various configurations under different forms.

Hence, the relational imprint may be consisted of one or several classes of similarity vectors, according to whether they are of disordered character or not, and/or obtained according to a calculation method or another one, and/or geographically distributed in a manner or another one in an image, and/or independent or not from each other, and/or stable or not . . . .

The relational imprint may contain only one class of similarity vectors, consisted by all or part of the similarity vectors forming the calculated field of imprint vectors.

The relational imprint of a set of subject images may refer to a same subject image. As the case may be, a same subject image may belong to a second or nth set of subject images referring to another reference image.

The relational imprint of a subject image may refer to a reference image of a different class (example of the subject image of a cellular material in reference to a reference image that is an image of a piece of paper, or of a piece of skin of a person).

The relational imprint of a subject image may also refer to an image of the same class (example of a ticket with its stub) or also to itself. In this latter case, the subject image may be transformed to generate a reference image allowing a calculation at the first rank of similarity of a field of imprint vectors, a region of which is disordered. According to a preferred embodiment, the subject image is transformed into a negative (compatible with the dynamic range of the potential rendering device), before applying the phase of calculating similarity vectors.

The relational imprint of a subject image may also refer to an image of a given class, as the case may be, formed and/or described at least partially by a method of image synthesis such as a method of generation of dynamic textures. When the method of image synthesis uses at least one input parameter belonging to a set of great size, as in the case of a method of reaction-diffusion with a (pseudo)-random input image, said input parameter(s) may serve as a seed, as the case may be secrete, to generate on demand the corresponding reference image.

A relational imprint may also be determined according to one or several reference images, making it possible to use the method of the invention in several environments, each using a same reference image, while maintaining a tightness between the environments.

According to a characteristic of the invention, the method comprises, previously to the recording phase, a step of classifying the similarity vectors into at least one so-called disordered class, and one so-called regular class, consisting in allocating each of the similarity vectors to either one of the classes according to a regional entropy criterion and a classification threshold.

According to a characteristic of the invention, when it is chosen to calculate the similar indicator at a rank equal to one, each similarity vector is brought/added either to the disordered class or to the regular class, according to whether it fulfils or not the entropy criterion, wherein the null vector can then be introduced/added into the regular class or in the disordered class, respectively, as a complement.

The relational imprint may be recorded, for example, as a list of sets of similarity vectors linked to their reference points, according to the class they belong to.

According to a characteristic of the invention, the relational signature is recorded for a latter use, preferably into a database or even into a graphic code.

According to a characteristic of the invention, the method comprises a step of compressing the field of imprint vectors and recording the compression result as a relational imprint.

According to a characteristic of the invention, the recording of the relational imprint is associated with the recording of at least one of the images used.

It is to be noted that, in the sense of the invention, the term "recording", without precision, is understood in the broad sense, of course subject to being compatible with the corresponding implementation of the invention. Hence, the term "recording", in the sense of the invention, is aimed at a recording in any suitable way under a digital or analog form. Among the recording modes compatible with the invention, it may be mentioned, in particular: a recording under any computer and/or electronic format, a recording under a printed form on a support adapted to the implementation of the invention, a photographic recording, in colour or in black and white, a recording under a holographic form, a recording under an engraved form, in particular by a laser, without this list is limitative nor exhaustive.

In the sense of the invention, it is to be understood by "tile", a part of a marked image that contains spatial information, about the structure or microstructure of a material object (for example, naturally present inhomogeneity) and/ or of synthetic structural nature (for example, a synthesized pattern or pseudo-hazard) and/or also local characteristics calculated based on this structural or microstructural spatial information (for example, local invariant descriptors). Within the framework of the invention, the terms "texture" or "microtexture" relate to what is visible or observable on an image, whereas the terms "structure" or "micro-structure" relate to the material object itself. Hence, a texture or microtexture of the authentication region corresponds to an image of the structure or microstructure of the authentication region.

The phase of calculating similarity vectors comprises: a step of determining a mark common to the first and second images; a step of determining, in the first image, a set of reference tiles each associated with at least one reference point having coordinates in the common reference system; a step of searching, in the second image, for concordance tiles that are each matched with a reference tile with which they have a certain degree of similarity and are each associated with at least one reference point having coordinates in the common reference system; a step of calculating coordinates of each similarity vector based on the coordinates of the reference points of each reference tile and of the associated concordance tile.

According to a characteristic of the invention, the similarity vectors are calculated in the plane or a two-dimensional space.

The reference tiles may cover the whole support image or not, may overlap each other or also be separated from each other, leaving a portion of the support image non covered.

The reference tiles and/or their spatial distribution may be of predetermined or of auto-adaptive nature. It is even conceivable, for a same image, to combine these two configurations.

They may be predetermined based on, for example:
a given grid, knowing that this grid may be consisted of tiles of regular or non-regular (distorted grid) shape, size and position;
or a set of distinct unitary tiles, of regular or non-regular shape, size and position, with or without overlapping.

The reference tiles and/or the spatial distribution thereof may moreover be determined in an auto-adaptive way, automatically at the time of implementation of an algorithm of detection of local characteristics, for example.

The reference points and/or the spatial distribution thereof may be of predetermined or of auto-adaptive nature. It is even conceivable, for a same image, to combine these two configurations.

They may be predetermined based on, for example:
nodes of a given grid, knowing that this grid may be regular or not (distorted grid);
or a cloud of points.

The reference tiles and/or the spatial distribution thereof may moreover be determined in an auto-adaptive way, automatically at the time of implementation of an algorithm of detection of local characteristics, for example.

The step of searching for concordance tiles may use, for each reference tile, the calculation of a series of similarity indices between the portion of the first image corresponding to said reference tile and an inspection portion of the second image, the inspection portion being displaced in the second image for each similarity index and by selecting as a concordance tile associated with said reference tile, the inspection portion having a remarkable degree of similarity with said reference tile.

The step of searching for concordance tiles may also comprise determining, in the second image, a set of inspection tiles, and, for each reference tile:
calculating a series of similarity indices, each similarity index being calculated between the portion of the first image corresponding to said reference tile and the portion of the second image corresponding to an inspection tile, the inspection tile being different for each index,
selecting, as a concordance tile associated with said reference tile, the inspection tile having a given degree of similarity with said reference tile.

The determination of the sets of reference and inspection tiles may be performed in an auto-adaptive way, by implementing an algorithm of characteristic detection and description, for example coming from Law, or local binary patterns (LBP), or signal level gradient, or distribution, or spatiotemporal filters, for example integrated in the following methods A-KAZE, SURF, SIFT, ORB . . . .

The step of searching for concordance tiles may also be performed by combining the two above-described approaches, sequentially and/or simultaneously.

In the sense of the invention, the similarity between two tiles is evaluated according to a method of calculation, by means of a similarity indicator and a chosen similarity rank n (the first maximum if n=1, the second maximum if n=2, etc.), whose value, called the similarity index (positive or absolute value), is all the higher since the tiles are similar to each other. The remarkable degree of similarity is the maximum similarity index of the series of similarity indices calculated for a given reference tile and for a method of calculation.

According to a characteristic of the invention, the degree of similarity corresponds to the rank of the inspection tile retained as a concordance tile in the series of inspection tiles ordered according to their index of similarity with the reference tile in the decreasing order.

The standardized correlation or the correlation by difference may be used as a type of similarity indicator. More generally, the inverse of a suitable distance or divergence may be used as a similarity indicator. The similarity indicator may also be applied to the matching of characteristic points of interest detected and quantified by means of local descriptors between tiles, for example coming from Law, or local binary patterns (LBP), or signal level gradient, or distribution, or spatiotemporal filters. Hence, the comparison means integrated in the following methods A-KAZE, SURF, SIFT, ORB . . . may be used as indicators of similarity in the sense of the invention.

According to a characteristic of the invention, during the phase of calculating similarity vectors between the first and second images, the local similarity indicator is chosen at a local rank higher than or equal to one.

According to a characteristic of the invention, the two images implemented are identical to each other and a similarity indicator of rank 2 is chosen so as to calculate the similarity vectors in the determination of the relational imprint.

According to the method of the invention, the similarity vectors are calculated up to a rank that is high enough to obtain a field of imprint vectors comprising at least one disordered region in the sense of an entropy criterion.

In the sense of the invention, the entropy criterion is intended to decide of the disordered or not character of a candidate similarity vector with respect to similarity vectors located in one of its vicinities whose shape and size are predefined. This binary criterion consists for example in applying a predefined threshold to an unpredictability index, evaluated in the vicinity, such as the entropy of the (normalized) histogram of orientation of the similarity vectors, as the case may be, weighted by their norm. The entropy criterion is then verified and the candidate similarity vector will be qualified as disordered (i.e. placed in the class of the disordered vectors) when the unpredictability index has a value higher than (or equal to) the threshold value (for example 1 BIT). In the opposite case, the candidate similarity vector will be placed in the regular class. In another way, the ratio of the mean to the standard deviation of the modules of the similarity vectors in the vicinity of a candidate similarity vector may be considered as an entropy criterion. If higher than 1, typically, then the candidate similarity vector will go to the disordered class; in the contrary case, it will be brought to the regular class. Of course, a compromise between size of the vicinity and fineness of discrimination must be searched for. Likewise, the shape of the vicinity may be important according to whether we work on lines, columns or rectangular tiles. Other entropy criteria are applicable within the framework of this invention. In the sense of the invention, when a region of a field of similarity vectors of rank n comprises, in a connected region, a dense set of similarity vectors, all disordered, in the sense of absence of an underlying rule, of chaotic aspect, it is said to be "disordered of rank n". In the opposite case, it is said "regular", in the sense of existence of an underlying rule, for example in the sense of regularity of the underlying field of vectors it represents and of continuity of the associated lines of field. It may for example also be talked about an ordered class as shown in FIG. 7, insofar as the angular distribution on the right is a little scattered, whereas, for the disordered class, the angular distribution is totally scattered over the 360° of the trigonometric circle. Likewise, as shown in FIG. 14, it may be talked about a regular class in 14-B insofar as the rule that applies is "the most of correspondence in the blank printing zone", whereas, in 14-A, there is no correspondence in the considered zone, hence, implicitly, disorder of correspondence.

The images that the method of the invention implements must be located at least in certain regions having locally variable spatial structures so as to make it possible to evaluate therein to a significant extent the similarity in the sense of the similarity indicator, between reference tiles of the first image and inspection portions or tiles of the second image. In the sense of the invention, it is to be understood by "locally variable structures", the presence of image attributes such as contours and/or textures, as the case may be, multiscale, liable to characterize that the subject image belongs to a class of images or to characterize the subject image inside a same class of images.

According to a characteristic of the invention, the reference image for each material subject is the inverted image of the material subject image, reference image which is used for the method of determining the relational imprint.

According to a characteristic of the invention, the reference image is identical for all the material subjects considered.

According to a characteristic of the invention, it may be used as a reference image a concatenation of several images, which amounts to calculate similarity vectors on a same starting image in relation to several material subjects, for example, or to material subjects and synthesis images.

The term "image" is to be understood in the broad sense and not limited to the single sense of an optical image resulting in particular from the application to the authentication region of a visible luminous radiation. Hence, the authentication and verification images may be obtained by any type of solicitation on the authentication region in association with a suitable acquisition chain, it being understood that the same type or the same nature of action is implemented for acquiring both the authentication and verification images. Among the conceivable types of actions or modes of acquisition, it may be mentioned, in particular: the ultrasounds, the far infrared, the Tera-Hertz, the X or gamma-rays, the X-ray or laser tomography, the X-ray radiography, the magnetic resonance, without this list is limitative nor exhaustive. It may also be understood by "image", in the sense of the invention, a 3D representation of a material subject with a suitable microtexture representing the stable, intrinsic, unique and non-reproducible microstructure of the material subject considered.

Optical and/or digital pre-processing for improving the image may hence be applied to the latter for a better signal-to-noise ratio and/or a better visual perception. Hence, an optical zoom (variable focal-length devices) and/or a digital zoom, to better select the scale of observation, a deconvolution of the image in order to suppress a focusing defect or a blurring, a band-pass filtering to select/favour the details of intermediate frequencies or a contrast enhancement to accentuate the contrast, may for example by applied. Hence, in order to facilitate the visualization of the relational imprint, the authentication and verification images may, before being displayed or even being recorded, be subjected to one or several improvement processing operations, such as, for example, a contrast increase, a light increase, an equalization of the grey level histogram, an equalization of the histograms in the decomposition colours, a band-pass filtering. In this respect, it is to be reminded that the method according to the invention may be implemented with grey-level images and/or colour or multispectral images, or with binary images.

According to another characteristic of the invention, the position of the authentication region on the subject to be authenticated is recorded. Such a recording allows, although this is not necessary, facilitating the verification phase.

According to still another characteristic of the invention, the position of the authentication region on the subject to be authenticated is marked on the subject to be authenticated. This marking also allows, although this is not absolutely necessary, facilitating the verification phase.

According to a characteristic of the invention, the phase of calculating the field of imprint vectors comprises, before calculating the field of imprint vectors, a step of transforming one and/or the other of the first and second images.

According to a characteristic of the invention, the image transformation step applied consists in at least one geometric transformation applied locally to an image chosen among the linear transformations or combinations of linear transformations. Preferably, the transformation is a transformation with at least one fixed or quasi-fixed point. By quasi-fixed point, it will be understood a point undergoing a displacement of very small amplitude.

According to another characteristic, the image transformation induces a reduced or small- or very-small-amplitude modification of the modified image portion of the image of the authentication region before modification.

According to still another characteristic of the invention, the relative displacement is a translation, a rotation or the combination of one or several rotations and/or translations.

According to still another characteristic of the invention, the distance of relative displacement is reduced or of small or very small amplitude.

According to a characteristic of the invention, the transformation step is a registration.

According to a characteristic of the invention, the method comprises, before the calculation phase, a parameterization step comprising the determination of one at least of the following parameters:

- size, shape, position of the or each of the reference tiles applied to the first image,
- predefined spatial distribution of the reference points or also algorithm used and initial data for determining them,
- size, shape, position of the or each of the inspection tiles applied to the second image,
- similarity indicators that are chosen and, as the case may be, the rank(s) to be used, as the case may be, as initial value(s) during an incremental search for a disordered region,
- order(s) of use of the first and second images,
- size, shape of the vicinity for evaluating the entropy criterion,
- threshold density based on which a connected region formed of disordered vectors is declared as being disordered,
- size, shape, position of the reference and/or concordance tiles, order of use of the first and second images,
- size and shape of an evaluation window for determining the existence of a disordered region.

According to a characteristic of the invention, the method comprises a step of using, as a relative or relational signature of an image with respect to the other, a digital representation of the relational imprint.

According to a characteristic of the invention, the method comprises a step of sensorially representing the relational imprint. This sensorial representation is then preferably visual and/or sonorous and/or tactile.

According to a characteristic of the invention, the phase of calculating the field of imprint vectors comprises:

a step of calculating several fields of intermediate similarity vectors between one of the two images and the other image having undergone a transformation that is different from an intermediate similarity vector to the other, comparing the fields of intermediate similarity vectors between each other and keeping as a field of imprint vectors the field of intermediate similarity vectors having a similarity optimum, maximum or minimum.

According to a characteristic of the invention, the method comprises, before the recording phase, a step of decomposing the field of similarity vectors into at least one so-called regular portion and one so-called disordered portion consisting in allocating each of the similarity vectors to either one of the regular and disordered portions according to a regional entropy criterion.

According to a characteristic of the invention, when the local similarity optimum is chosen at an order equal to one, fora considered local rank, the concerned similarity vector is added either into the disordered component of the field of imprint vector, or into the regular component of the field of imprint vectors, according to whether it fulfils or not the regional entropy criterion, the null vector being then added into the regular component, or into the disordered component, respectively.

According to a characteristic of the invention, the method comprises a step of coding the relational imprint, a digital shaping, in order to obtain a relational signature of an image with respect to a reference image, which may serve as an unitary, robust, authenticator of the subject image or of the imaged material subject.

In this last case, coming from the material subject and not in correspondence with the material subject as a simple identifier, the relational signature is intended to singularize the material subject without ambiguity (unicity and intrinsic character, hence non-reproducibility), while being regenerable at any instant based on a new image acquisition, and stable over time within the framework of a normal evolution of the material subject. The reference image may be a natural or synthetic image of nature perfectly different from the starting image (for example, relational signature of a piece of paper with respect to a piece of sintered bronze or also a piece of leather).

The coding of the relational imprint then constitutes a step in obtaining the relational signature, wherein the similarity vectors, in particular the similarity vectors of the disordered class, are subjected to a quantification according to the "letters of a coding alphabet", typically but non-exclusively binary, quaternary or else.

The coding step may preserve the sequencing of the vectors of similarity of the relational imprint according to the topology of the reference image from which they come. Within the framework of a hierarchical organization of access to the random imprint, the coding step may use a pseudo-random swapping of the obtained letters, generated by means of a secrete seed.

According to a preferred mode of the invention, the coding of the similarity vectors of the relational imprint is performed according to the orientation thereof, by means of a compass rose divided into equal angular sectors, typically in quaternary mode {North-East, North-West, South-West, South-East}, or in binary mode {North-East \ South-West, North-West \ South-East}. The quantification may be followed with an allocation of bits according, for example, to a Gray code, and/or a compression, for example an entropic compression, by ranges or of the Huffman type, or also algorithmic, for example by dictionary.

In a preferred embodiment, the relational signature is a chain of concatenated bits, obtained by coding of the similarity vectors of the disordered class according to the angular sectors North-East\South-West and North-West\South-East in which its similarity vectors are inscribed.

A relational signature may be used to discriminate and/or identify the subject image in a set of images or the material subject object of its acquisition in a set of material subjects.

A relational signature may be obtained from a reference image that is a transform of the subject image. It then takes on a more "absolute" character.

The relational signature, by way of practical example of use, allows discriminating in a stable and certain manner a sample of paper in a paper ream: a set of 200 material subject elements, centimetric portions of imaged papier sheets, are considered herein. The relational signature has a more "absolute" character insofar as the reference image is the complement to 1 of the standardized image of a material subject. The parameters of implementation are: a distribution of reference points according to the nodes of a regular grid of pitch 24×24 pixels; reference tiles, of size 64×64 pixels, centred to these reference points; for each reference tile, four inspection tiles of size 64×64 pixels partitioning an inspection portion of 128×128 pixels centred to the reference points; the standardized centred correlation at rank 1 as a calculation method (calculation of the series of similarity indices by superimposing the current reference tile to each inspection tile considered, and by choosing as a concordance tile, that whose similarity index is the highest) and a vicinity size 3×3 (i.e. the 8 similarity vectors surrounding the current vector), considered for evaluating the entropy criterion. The disordered class/component is hence consisted of 11×15=165 vectors (Figure in which every other vector is shown), whose direction North-East \ South-West, coded "0", or North-West \ South-East, coded "1", gives a binary signature of 165 bits. The normalized Hamming distance measured between the signatures coming from different subject images from distinct material subjects is on average of (49.987+/−4.659) % with a bias lower than 0.02%. The hamming distance measured between the signatures coming from different subject images from a same material subject, after registration of the images, is on average of (5.454+/−1.967) %. The two distributions are quantitatively separated by 12.452 in the sense of the difference in absolute value between their average values normalized by the square root of the half-sum of their variances. This provides a power of discrimination pertinent for the automatic use of the relational signature in the perspective of an unitary authentication of material subjects in families containing several millions or billions of individuals.

The relational signature may be used as a seed, for example at the input of an algorithm for generating pseudo-random numbers or images.

The relational signature may be used within cryptographic mechanisms.

When the subject image results from the acquisition of an image of a material subject, a relational signature that then contains the true hazard may be refined by algorithmic processing. The relational signature may be subjected (without transcoding if it is binary) to a Von Neumann correction and an exclusive OR or to a hash function or also to a resilient function in order to constitute a generator of random numbers.

As such, the relational signature may constitute an image to be shared within the framework of a visual secret sharing (it will be talked about visual cryptography when the relation signature fulfils the criteria of a sequence of independent random numbers). In a preferred embodiment, the relation signature results from a relational imprint reduced to its disordered class/component, quantified according to the angular sectors North-West (NW or 1), South-West (SW or 2), South-East (SE or 3) and North-East (NE or 4), wherein the similarity vectors thereof are inscribed. By substituting each quaternary code by a triangular sub-matrix, respectively on the top right, the top left, the bottom left and the bottom right, the so-constructed shared image has a texture with triangular elementary shapes. In a secret sharing between two participants, the second shared image may be constructed, for example, by considering the same triangle as that adopted in the first shared image, at the same place if the bit of the secret message at this place is 0, and considering the opposite triangle (for ex., SE, if the triangle in the first shared image was NW) if the bit of the secrete message at the place is 1. When the subject image results from the acquisition of an image of a material subject, the first shared image may not be saved but reconstructed from a new acquisition of the material subject.

Still according to the invention, the triangular texture of the shared images may allow introducing an anti-fraud mechanism for the shared images. An additional image, held by the trusted third-party when it constructs the images to be shared, may be used at the time of decryption of the secret message. This additional image, of same size as the shared images, is intended to point the triangle opposite to the triangle associated with each quaternary code in the first shared image after construction of the second shared image, by means of a null sub-matrix except at the West (W), respectively South (S), East or North (N). The second shared image is constructed by recopying the corresponding triangle of the first shared image if the message bit is 0, so that the superimposition of the two shared images produces at this place a (that) triangle, and by randomly or pseudo-randomly selecting a different but not opposite triangle, if the message bit is 1, so that the superimposition of the two shared images produces at this place a notch (and not a square). At this place, the additional image is constructed so that, superimposed to the two shared images, the shape obtained is a corner if the message bit is 0, respectively a square (rectangle) if the message bit is 1. By way of illustration: if the code at the position i of the relational signature is 1, it is created at this position a triangle NW in the first shared image (within a square sub-matrix). If the message bit is 0, it is created at this same position a triangle NW in the second shared image and a sub-matrix (of same size), null except at the East (or at the South according to a [pseudo]-random draw) in the additional image. If the message bit is 1, it is created at this same position a triangle SW (or at the NE according to a [pseudo]-random draw) in the second shared image and a null sub-matrix, except at the East (respectively at the South) in the additional image. That way, the fraudulent substitution of a triangle by another one in a shared image makes appear: upon superimposition of the two shared images, a square, on average half the time, instead of the notch at the place of the message, and, upon superimposition of the two shared images and of the additional image, a notch, on average half the time, instead of a corner at the place of the background (zone that is complementary to the message).

The relational signal may also allow authenticating the subject image according to a protocol without knowledge divulgation. Due to the fact that it does not show the structures of the subject and reference images, the relational signature may advantageously be used as an answer to a challenge consisting in a synthesis model of a class of reference images. A secrete seed, shared or derived from the relational signature, may be used upon receipt of the challenge to generate the reference image, according to the model (which may be defined to within the seed by an equation, typical case of a reaction-diffusion), before determining the relational imprint between the subject image and the reference image generated, and therefrom the associated relational signature. When the subject image results from the acquisition (in predefined conditions) of an image of a material subject that is unclonable at the acquisition scale, the material subject in question may be used as a Physical Unclonable Function intended for the authentication thereof through the preceding challenges/answers pairs.

According to a characteristic of the invention, a same reference image is used as a first, respectively second, image, systematically, for a set of images, allowing calculating a set of relational signatures according to a same reference.

According to a characteristic of the invention, the method of determination of a relational imprint is implemented with at least one image of a material subject presenting a zone having an intrinsic and random micro-texture. In certain embodiments, this zone with a random intrinsic microtexture may be qualified as an authentication zone. In this respect, the inventors had the virtue to demonstrate that the relational imprint in the sense of the invention may be determined based on images of random and intrinsic microtexture zone without it is required that these zones have shapes, contours or patterns with a size far greater than that of the random intrinsic microtexture.

In the sense of the invention, the microtexture is intrinsic and random in that it results from the nature itself of the authentication area. In a preferred embodiment of the invention, each subject to be authenticated belongs to the families of subjects comprising at least one authentication region comprising an essentially random intrinsic structure, that is non-easily reproducible, i.e. whose reproduction is difficult, or even impossible, in that it results in particular from a process that is not predictable at the observation scale. Such an authentication region with an essentially random, non-easily reproducible, intrinsic continuous medium structure, corresponds to the Physical Unclonable Functions (PUFs), such as defined in particular by the English publication Encyclopedia of Cryptography and Security, edition January 2011, pages 929 to 934, in the article of Jorge Guajardo. Preferably, the authentication region of a material subject according to the invention corresponds to an intrinsic physical unclonable function, referred to as "Intrinsic PUF" in the above-mentioned article.

The inventors take advantage of the fact that the random nature of the microstructure of the authentication region is inherent or intrinsic to the nature itself of the subject because it results from its mode of elaboration, development or growing, so that it is not necessary to add a particular structure to the authentication region, in particular a printing, or an engravement. However, that does not exclude the use of natural or added singularities to facilitate the registration and/or the relative scaling, for example, or any other transformation of an image relative to the other.

The inventors have moreover shown that a regular field of similarity vectors appears visually only when the images of the random structures are identical to within reduced modifications and does not appear when the images are not identical, as the case may be, to within a transformation or small deformations, or does not result from the acquisition of the same authentication region of a subject. It is to be noted that, visually, the similarity vectors of a regular field of similarity vectors appear carried by underlying lines of field.

The invention can hence provide a unitary visual authentication via the relational imprint and a sensorial conditioning while allowing, as disclosed hereinabove, an automatic unitary authentication via the relational signature.

The visualization of a dense-enough, regular or not, field of similarity vectors, moreover makes it possible, within the framework of the invention, to secure or reinforce the operator in his/her decision to validate or not the authenticity of the subject to be authenticated. In this respect, it is to be emphasized that the invention makes it possible to clear up the doubt as regards the authenticity of the subject to be authenticated insofar as a regular field of similarity vectors is observed. There is then certainty about the authenticity (if the conditions of implementation are correctly respected). On the other hand, in case of non-observation of a regular field of vectors, it is possible to conclude with certainty in the non-authenticity, at the express condition that strict parameters of implementation have been respected, and if the material subject has not undergone too detrimental modifications between its recording and its checking.

Moreover, the inventors have highlighted the fact that, insofar as the material subject has a sufficient material stability over time, images made a different instants that may be separated by several days, months or years, make it possible, according to the invention, to generate such regular fields of similarity vectors. Moreover, according to the invention, the subject to be authenticated may undergo modifications after the recording of the authentication image while remaining authenticatable insofar as a part of the authentication area has not been deeply affected by these modifications, voluntary or not.

According to a characteristic of the invention, a candidate relational signature is automatically compared with an authentic relational signature that has been previously recorded, into a database for example, according to a statistic criterion of similarity making it possible to consider the candidate relational signature as being similar to the recorded relational signature if a decision threshold is reached.

According to a characteristic of the invention, for each relational signature implemented, at least one image having made possible to generate a relational signature is an acquisition coming from a reference zone of a material subject, said reference zone having an intrinsic and random microstructure also called unclonable material structure (or PUF for "Physical Unclonable Function"). Within this framework, the validation according to the reaching of the decision threshold also implies that a candidate material subject is similar, or identical, to the reference material subject. The relational signature in relation to the candidate subject is then established based on at least one image of an authentication zone or region of the candidate subject having an intrinsic and random microstructure. Likewise, the relational signature in relation to the reference or authentic subject is established based on at least one image of an authentication zone or region of the authentic subject having an intrinsic and random microstructure. There will be identity or similarity of the relational signatures if the authentication zones are identical or similar. In the sense of the invention, it is to be understood that the image is said to be of the intrinsic and random microstructure zone in that the image comprises at least said zone but is not necessarily composed only of this zone.

According to a characteristic of the invention, the authentication and/or verification images are subjected to a desceening and/or filtering (band-pass filtering, for example) before the implementation in the sense of the invention. This characteristic makes it possible to eliminate potential periodic patterns liable to interfere with or to obstruct the good execution of the different steps of determining a viable relational imprint or relational signature in case of authentic subject.

The method being interested into the characteristic relation between two images through a relational imprint also makes it possible to use cognitive representation of the latter to check "at a glance" the total or partial degree of similarity between these two images. It is a conditioning, a cognitive shaping of the relational imprint, so that it can be perceived or interpreted by a human, or even a humanoid, within a process of sensorial authentication. This conditioning is complementary of the conditioning in the form of a relational signature: the first one is mainly designed to allow an intuitive decision by the user, whereas the second one is mainly designed to allow an automatic decision by a machine. These conditionings may join each other when relational signatures are implemented according to our method for visual cryptography purpose, and when this is the user who must judge the result obtained (intelligible, potential attack, aesthetic aspect . . . ) or, more generally, when a relational signature is used to produce an effect perceptible by a user.

In this document, we call "relational stimulus", the conditioning of the relational imprint as a signal capable to be perceived by the sensorial system of a mean user and to allow him/her to interpret it. By "perception", it is meant a visual, aural, olfactory, tactile, gustatory perception, of temporal, spatial nature, that, totally or partially separately or simultaneously. It will be talked about sensorial authentication in the general case, and about visual, tactile, sonorous . . . authentication, respectively, according to whether it uses the visual, tactile, sonorous . . . capacities of the user.

During the step of shaping the relational stimulus, a preferred mode consists in lying on the visual (SVH) and/or sonorous and/or tactile and/or audio-visual and/or spatiotemporal perception capacities of the user.

An example of relational stimulus, based on a given relational imprint, may be a representation of the latter as a coloured or not image, with one or several distinct 1D, 2D, or even 3D regions, that will be aimed at the visual perception capacities of the user.

Possibility to represent with different colours according to the constitutive class(es) of the relational imprint.

A mode of implementation of the invention as a method of visual authentication of a candidate image with respect to an authentic image is characterized in that it comprises the following steps:
  implementing the method of determining a relational imprint with the authentic image as the first image and the candidate image as the second image, or reciprocally.
  visually, graphically, displaying one or several classes of similarity vectors constituting the relational imprint, on one of the two images implemented,
  concluding in the authenticity at least partial or regional of the candidate image in relation to the authentic image, in case of observation of at least one ordered region in the visualization coming from the determined relational imprint.

The visual verification phase may comprise, before the displaying step, a step of searching for an authentic image to be compared with the candidate image. This step may be a step of determining the relational signature of the candidate image followed with a sending of the determined relational signature to a server that, in response to this sending, and based on the relational signature, addresses automatically to the electronic verification device one or several authentication images to be used for the displaying step. The server will then comprise a base of authentication images indexed on the basis of a relational signature and, possibly, an identifier of subjects to be authenticated. The verification may then consist in comparing quantitatively the signature extracted from the candidate subject, either with the signature pointed in reference in the database (one-to-one authentication), or with a sub-set of n signatures identified in the database (small n, typically of the order of 1 to 10) as the closest signatures and/or the most probable authentic subjects (1-to-n identification), wherein the corresponding authentication images can then be subjected to the visual recognition by the operator or transmitted as such so that the operator execute the method object of the invention.

A continuation of the use described hereinabove consists in that:
the support image, on which the visualization of one or several classes of similarity vectors constituting the relational imprint is applied, is consisted of the merging (blending according to the alpha channel) of the candidate and authentic images,
the images are implemented is such a manner that they can make appear an effect of the Glass type if they are at least partially.

It is hence provided to the user an additional aid that is particularly appreciable when the phenomenon of the Glass type is not strong enough or when the user is not sufficiently sensitized to the detection thereof.

Another mode of use of the method according to the invention as a method for authenticating a candidate image with respect to an authentic image passes by a nature other than visual for the relation stimulus and contains the following steps:
a. Recording:
determining a relational imprint between authentic image and a chosen reference image,
determining a relational stimulus, based on the relational imprint, aimed at at least one chosen type of perception, between the authentic image and a chosen reference image,
implementing a support content compatible with the chosen type of perception, recognizable or intelligible by the user,
modulating the support content with all or part of the relational stimulus, the modulation result being generally a little or not recognizable or intelligible by the user,
recording the result of the support content modulation and, as the case may be, indexing with the authentic image and/or the chosen reference image, accompanied, as the case may be, with the chosen type of perception.
b. Checking:
determining a relational imprint between the candidate image and the chosen reference image,
determining a relational stimulus, based on the relational imprint, aimed at the same type of perception than that used with the authentic image during the recording thereof, between the candidate image and a chosen reference image,
implementing the result of the modulation corresponding to the authentic image,
trying to demodulate the modulation result with all or part of the relational stimulus determined based on the candidate image,
concluding in the authenticity of the candidate image with respect to the authentic image in case of clear or intelligible perception by the user of a portion at least of the support content demodulated by the candidate image.

The invention moreover relates to a method of unitary authentication of each material subject of a set of material subjects characterized in that it consists, for each subject of the set, in:
implementing the method for determining a relational imprint as described hereinabove between an authentic image of the material subject and a reference image, and
recording the relational imprint, calculated in association with an authentic image of said material subject,
during the authentication of a material subject, implementing the authentication method according to the invention.

It is perfectly conceivable to use, without changing the spirit of the invention, a relational signature that is implemented instead of a relational imprint.

The authentication may be performed through a relational stimulus and may make use of the human cognitive functions, in particular by implementing one of the memories of the user.

It may also be provided that the previously described steps can be implemented repeatedly or successively by a user that interacts preferably with a device using the sense of touch and/or the speech and/or the vision, in a temporal and/or spatial manner. Real-time and playful effects may then be created, making it possible to refine the decision making and/or to establish the relation between two images, two products, a user and a product, on behalf of an action that have a priori nothing to do therewith.

The use of a terminal of the smartphone or touch-tablet or portable computer type seems particularly pertinent for this interaction, via a dedicated Application/computer program, which would allow the user to take advantage of this application and the editor thereof to ear knowledge about this user, the network thereof, etc. . . . via data that are captured or present in the terminal.

The invention also relates to an electronic device liable to be used for either one of the implementations of the authentication method according to the invention, in particular for the verification phase. Preferably, but not strictly necessarily, the electronic device comprises a visualization touch screen and is adapted to allow a modification of the visualization magnification of the authentication image and/or of the verification image by the displacement of two points of contact on the touch screen. The touch screen may also advantageously be used for controlling the relative displacement of the images implemented.

Many schemes of implementation of the present invention are possible, in particular in the security and marketing environment, and may also integrate the recognition of the product family, 1D or 2D barcodes, or other, be coupled to NFC or RFID chips.

The invention may find applications in different fields as, for example, in a process of traceability of a supply chain within which the different participants: producer, distributor, retailer, consumer are all interested by the control of the authenticity with different financial and technical means at their disposal to make this control possible. A producer holding the intellectual property rights may also be interested in knowing if a checked product is at the good place in the supply chain (control of the parallel markets), whereas a consumer is first worrying to know if the product in question is effectively authentic or if he/she can benefit from advices, advantages linked to an authentic product. The whole may be implemented as indicated hereinabove with the joint help of a unitary automatic authentication means (relational signature and/or identifier) and a sensorial authentication means as described in the present invention.

The invention may be implemented within the framework of various applications of authentication, identification, integrity checking and visual cryptography. In this respect, it is to be considered that, within the framework of the invention, the terms "authentication", "identification" and "integrity checking" may be equivalent according to the application contemplated.

An important use of the relational imprint is when an image of a material subject with respect to a reference image is calculated according to the method of the invention, and that all or part of this relational imprint is used to reposition the image of the material subject with respect to the reference image. Generally, this is made previously to the determination of a relational signature or of a relational stimulus.

This preferred mode may be implemented for a set of images coming from a set of material subjects, and the registration hence automatically operated according to a same reference image. The use of similarity indicators of the detector/descriptor type, such as SIFT, SURF, ORB or A-KAZE, may be particularly interesting for that purpose.

It is also possible to use distinct classes of similarity vectors present in a relational imprint, for, on the one hand, registration images coming from a material subject, but also to calculate one or several relational signatures and/or one or several relational stimulus.

The present invention also allows making integrity checking, in particular using a visual authentication between a candidate image and an authentic image coming supposedly from a same material subject or a subject material belonging to a same family. If these compared regions have integrity, then a regularity will appear in at least one field of similarity vectors corresponding to these regions, without major discontinuity, whereas if a portion of these regions has undergone a modification, then, at this place, must appear dissimilarities, translated by the presence of a local irregularity of the field.

Among the material subjects comprising an authentication region adapted to the implementation of the authentication method according to the invention, it may be mentioned, in particular: the papers and cardboard packages; the fibrous materials; the metallic, plastic, ceramic or other sintered materials; the alveolar or cellular materials; the leathers, including stingray leathers; the wood; the metals, in particular worked, coined, moulded, injected or rolled; the glass, the ground glass; the plastic materials; the rubber; the woven or nonwoven textiles (with possible descreening); certain furs or plumages; images of natural scenes, such as landscape images, building images, wall or road pavement images; the biometric prints, the skin or the fingerprints, the iris of an eye; the works of art; the powder products or materials, without this list is limitative, nor exhaustive.

Of course, the different characteristics, variants and embodiments of the method according to the invention may be associated with each other according to various combinations in so far as they are not incompatible or exclusive relative to each other.

BRIEF DESCRIPTION OF THE DRAWINGS

Various other characteristics of the invention will emerge from the following description given with reference to the appended figures that illustrate non-limitative embodiments of the invention.

DETAILED DESCRIPTION OF THE PREFERRED EMBODIMENTS

In the sense of the invention, the similarity between a first image and a second image or between portions of these images is evaluated by means of similarity indicator giving a positive value that is all the higher since the first image and the second image, or their respective portions, are similar to each other. The method of the standardized coefficient of correlation (in the statistical sense) constitutes an indicator of preferred similarity for the invention. The methods of correlation indicators in general, as the indicator of correlation by difference, are examples of other similarity indicators. The inverse of a distance or a divergence (in the mathematical sense) between the images or their portions constitute still other possible families of similarity indicators.

Figure 1:
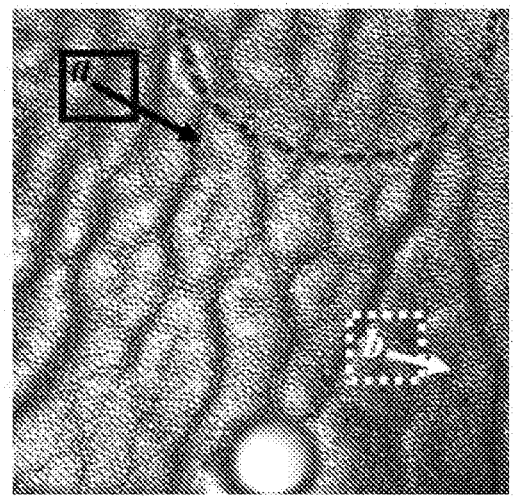
FIG. 1 explains modes of calculation of similarity vectors at a given rank.
Figure 1:
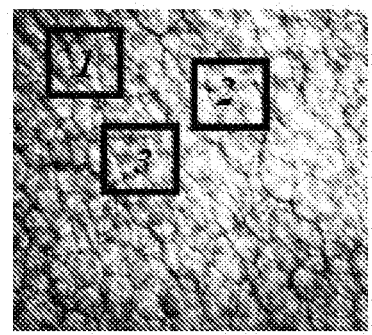
Figure 1:
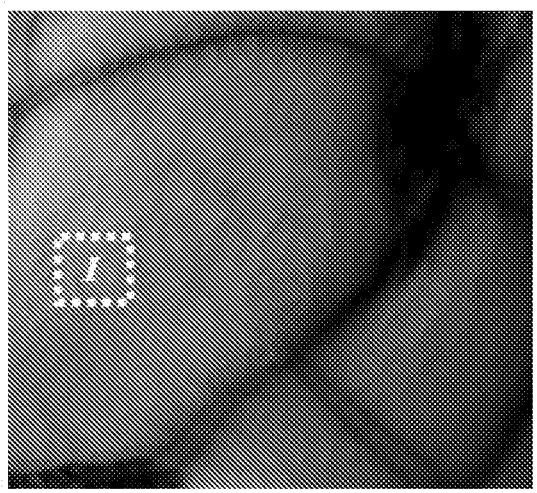
Figure 1:
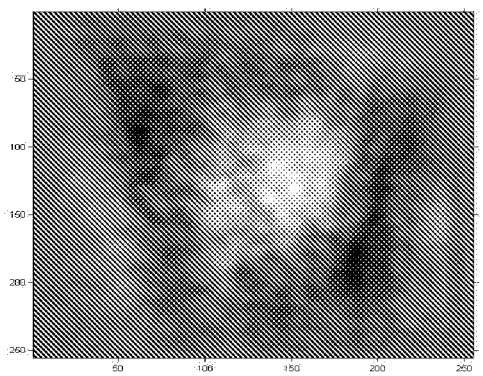
Figure 1:
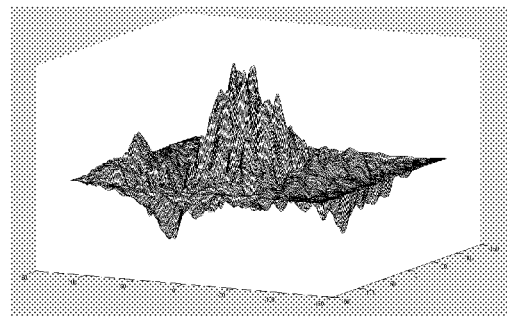

Hence, different methods of calculation may be implemented. By way of indication and in a non-limitative manner, FIG. 1 shows a first example of calculation of a similarity vector according to the standardized centred correlation coefficient (as a similarity indicator) at rank 2 by implementing as the first image 1-A the image, having a size 1637×1601, of a leather bag. In this context, the leather bag is the material subject.

According to this first example, the second image 1-B, of size 768×825, is an image of a portion of packaging made of semi-rigid foam. An index of similarity between a reference tile of the first image 1-A, and inspection tiles 1, 2 and 3, of size 128×128, of the second image 1-B, is calculated. The values of the standardized centred correlation coefficient obtained (as similarity indices) are respectively of −0.029 (tile 1), −0.050 (tile 2) and 0.032 (tile 3). By ordering in crescent order the absolute values of these similarity indices, rank 1 corresponds to tile 2, rank 2 to tile 3 and rank 3 to tile 2. The similarity vector at rank 2 applied to the reference point, centre of the reference tile a, then points towards the centre of the concordance tile at rank 2, herein the centre of the tile 3, it being considered that the coordinates of these two centres are determined in a same orthonormal reference system and the norm of the similarity vector is normalized at 1.

FIG. 1 also shows a second example of calculation of a similarity vector according to the standardized centred correlation coefficient (as a similarity indicator) by implementing as the first image, the same image 1-A, and as the second image 2-C, a ceramic image of size 1142×1162. The reference tile b is then compared successively to each of a series of inspection tiles corresponding to the tile/of size 128×128 translated one pixel by one pixel. The values of the standardized centred correlation coefficient obtained (as similarity indices) constitute a correlation figure 255×255 having local extrema of different ranks represented as a grey-level image 1-D or a grey-level surface 1-E. The similarity vector at rank 2 applied at the reference point, centre of the reference tile b, then points towards the centre of the concordance tile offering the local maxima of rank 2 among the values of the calculated correlation coefficient (similarity indices).

Figure 2:
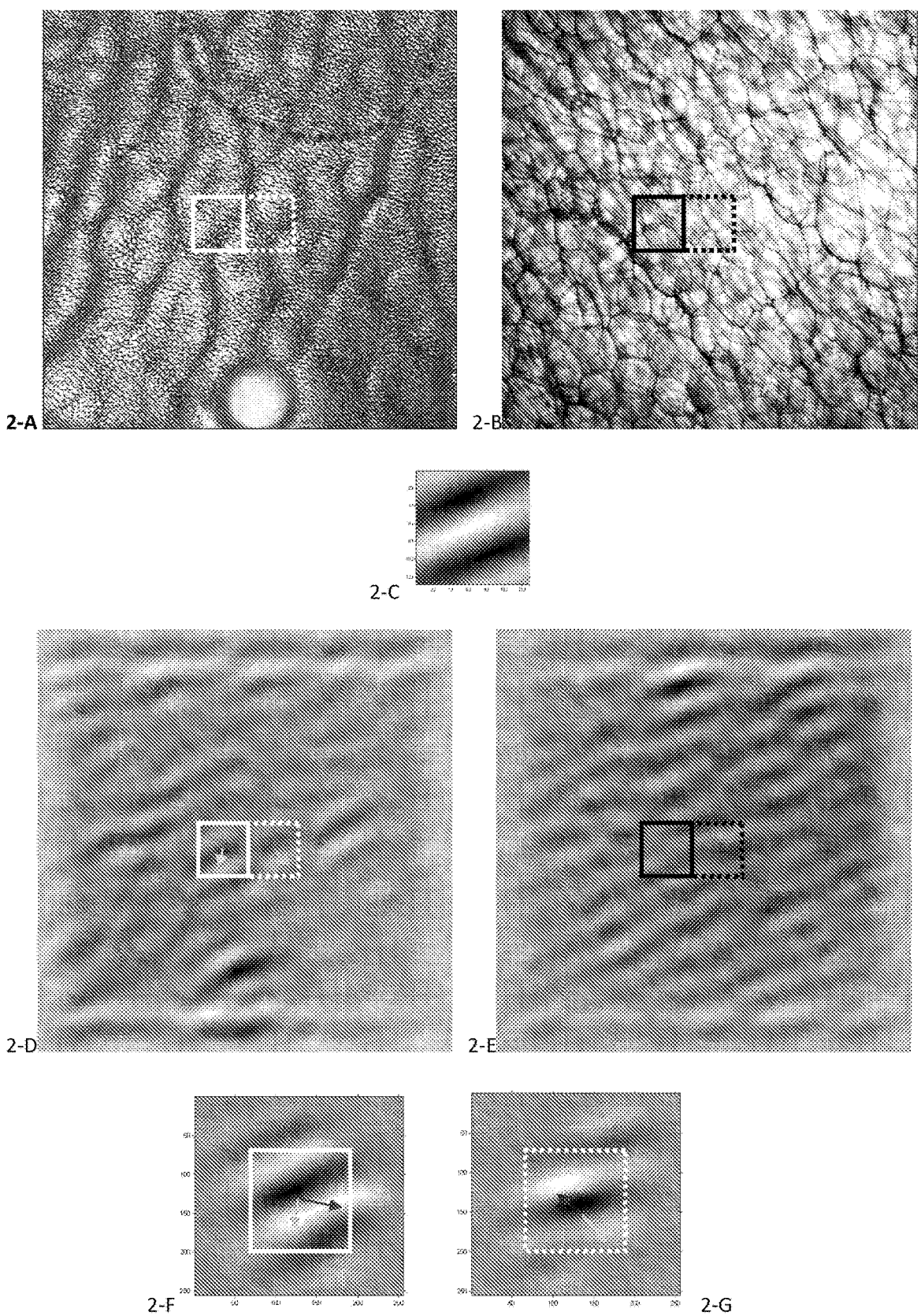
FIG. 2 shows an example of a field of similarity vectors obtained within the framework of an implementation of the method according to the invention.

According to a third example of implementation of the invention illustrated in FIG. 2, the similarity vectors are calculated according to the standardized centred correlation coefficient (as similarity index) on the subject image of a leather bag element 2-A and the reference image of a packaging element made of semi-rigid foam 2-B after filtering of the images by means of a band-pass filter (herein the real part of a Gabor wavelet) 2-C between the reference tile 128×128 and the and the inspection portion 128×128 in full lines, respectively dotted lines, extracted from the filtered images 2-D and 2-E. The similarity vectors at rank 2 (respectively rank 1) associated with the secondary (respectively primary) local maxima of the correlation figures are indicated in white (respectively black) in the corresponding correlation FIG. 2-F in full lines and 2-G in dotted lines.

Figure 3:
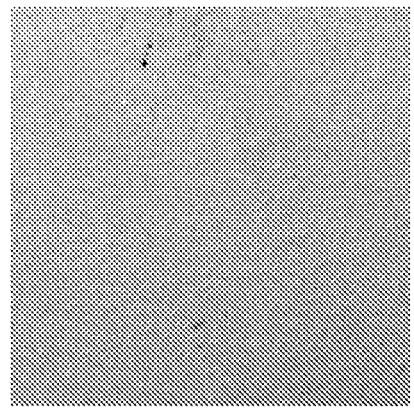
FIG. 3 shows another example of a field of similarity vectors obtained within the framework of an implementation of the method according to the invention.
Figure 3:
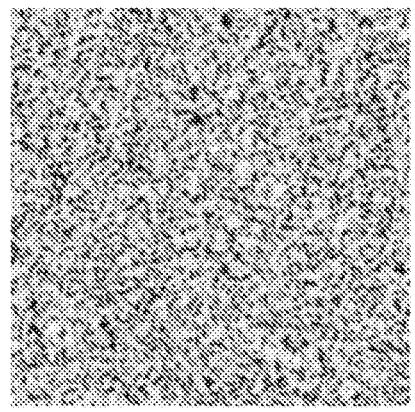
Figure 3:
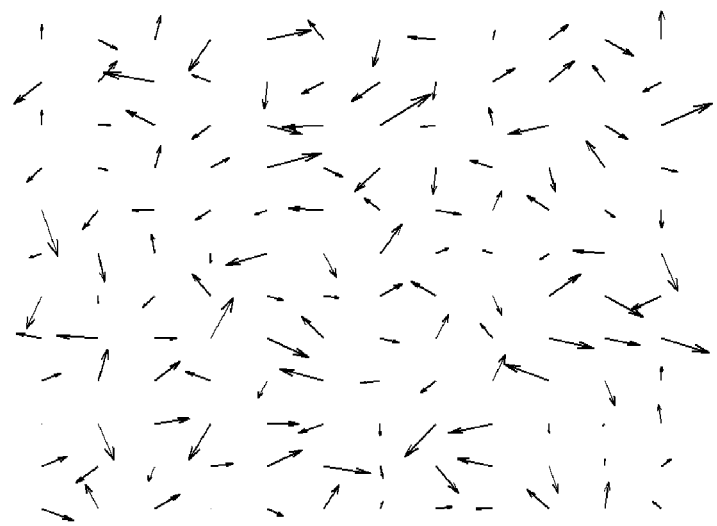

According to a fourth example of implementation of the invention illustrated in FIG. 3, it is used as the first image 3-A an image of a subject made from frosted glass, of size 384×384, acquired in reflexion under a diffuse lighting. It is used for this second example as the second image or reference image an image of same size 3-B, synthesized by reaction-diffusion from a seed. The image 3-C shows a field of similarity vectors at rank 1, calculated using the standardized centred correlation at rank 1 as a similarity indicator and comparing reference tiles of the image 3-A of size 32×32 each centred on one node of a regular grid of pitch 32×32 with inspection tiles of size 32×32 of the image 3-B. Each similarity vector is then applied to the centre of a reference tile and directed towards the centre of the inspection tile having the highest coefficient of similarity with said reference tile. The norm of each similarity vector corresponds to the value of said similarity coefficient, it being understood that the coordinates of these two centres are determined in a same orthonormal reference system.

Figure 4:
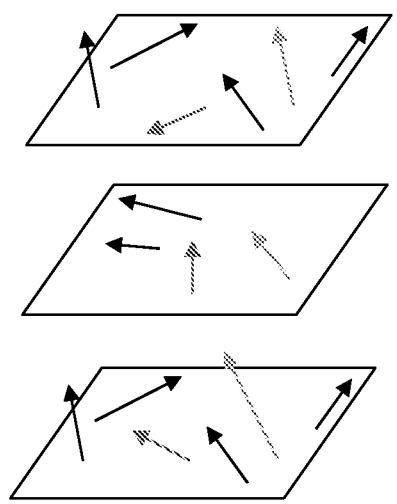
FIG. 4 shows a field of imprint vectors resulting from the superimposition of fields of vectors of similarity.

FIG. 4 shows a field of imprint vectors (bottom) formed by the superimposition of a field of similarity vectors calculated according to a regular grid by a first method at rank k (top) and a field of similarity vectors calculated according to interest points by another method at rank I (middle). Each of the similarity vectors is reported at its point of application in the field of imprint vectors and vectorially summed, as the case may be, with the similarity vectors that are applied at this same point.

Figure 5:
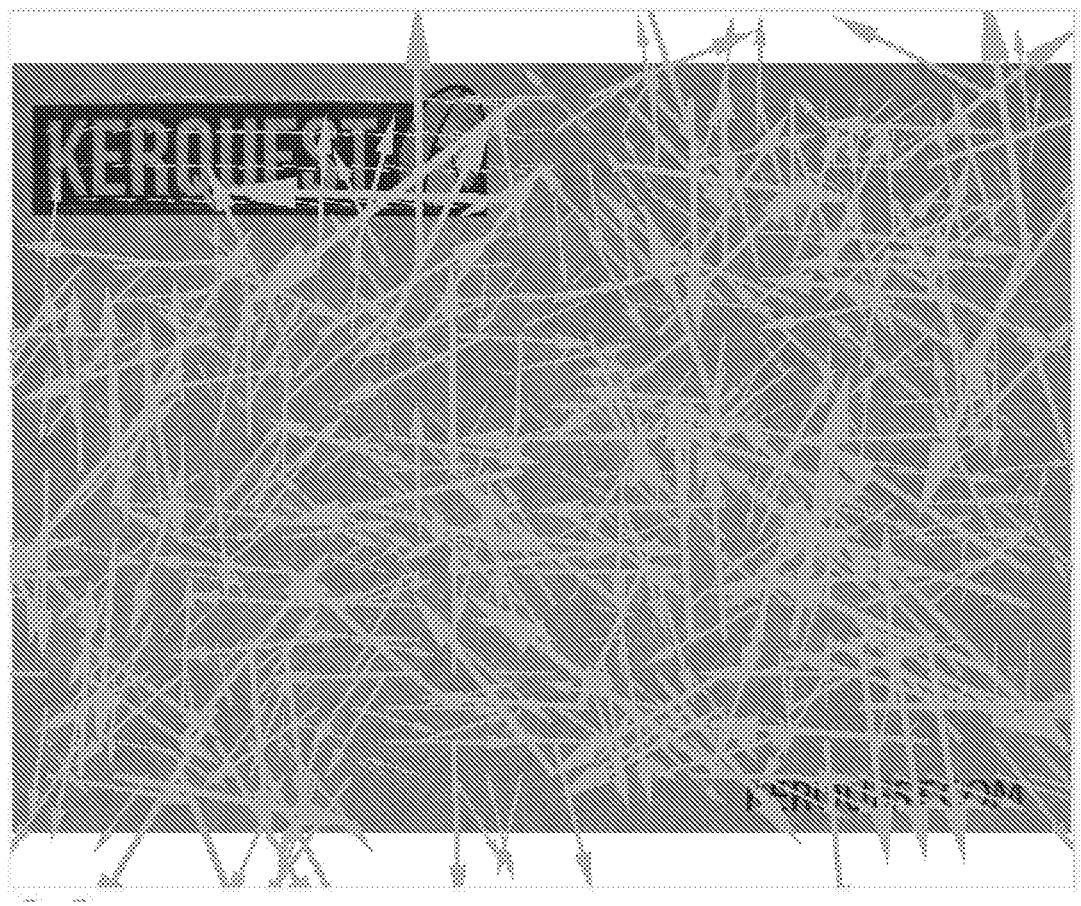
FIG. 5 shows another field of imprint or similarity vectors resulting from the implementation of images of the subject formed by a paper sheet.

FIG. 5 shows the graphical representation, forming a field of imprint vectors, of a field of similarity vectors at rank 1 that is obtained by the comparison of a first image whose subject is a first paper document with a printed pattern with a second image or reference image whose subject is a second document with a same printed pattern but distinct from the first one. The field of similarity vectors is calculated by correlation of reference tiles and inspection portions, centred onto the nods of a reference grid 64×64, with interpolation of the peak of correlation in the vicinity of the maxima maximorum.

Figure 6:
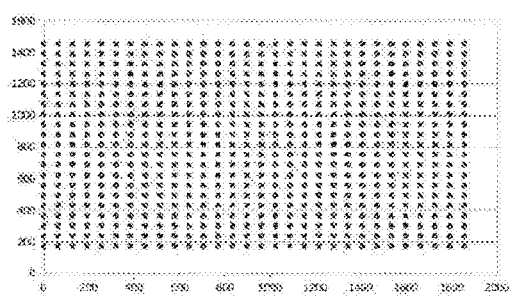
FIG. 6 shows a representation of the relational imprint shown in FIG. 5.
Figure 6:
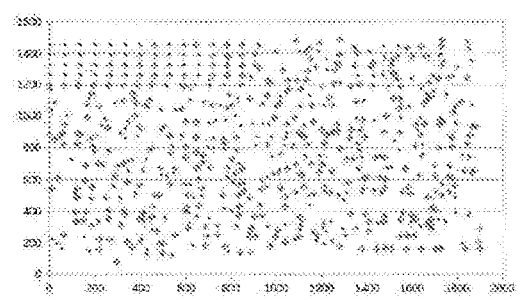

FIG. 6 shows a representation of the relational imprint extracted from FIG. 5, in which are listed (FIG. 6-A), in pixels, the coordinates u and v of each of the similarity vectors whose (reference) application points are distributed according to a regular grid (FIG. 6-B) of pitch 64×64 and beginning at x=0 and y=175 to finish at x=1856 and y=1455, according to three classes of similarity vectors after the use of an entropy criterion (see FIG. 7): the disordered class that occupies the major part of FIG. 5, then two regular classes corresponding to the zones with a printed pattern, at the top left and the bottom right, respectively. The graph (FIG. 6C) corresponds to the calculation of the points (x+u, y+v), without application of a scale factor for the visualization as used for the vectors of FIG. 5, which also allows noting at a glance the 3 previously mentioned classes. It is to be noted that the pitches of the grid used (x, y) may be saved in a file of associated parameters, or according to the choice in the relation imprint itself.

Figure 7:
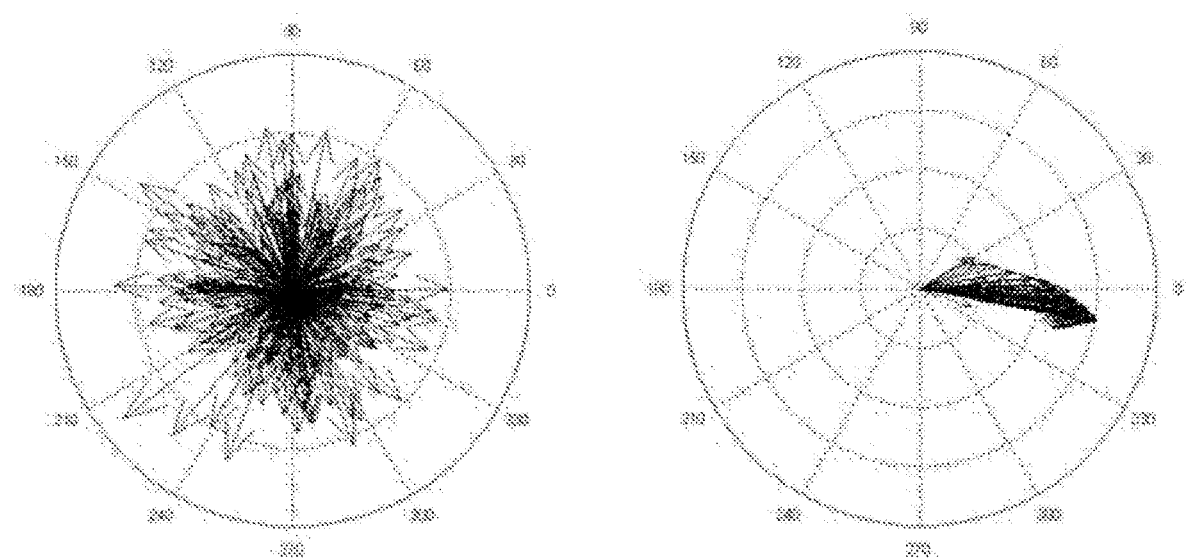
FIG. 7 shows the angular distribution of a disordered class and a regular class of similarity vectors of the field of imprint vector of FIG. 5.

FIG. 7 shows the angular distribution of the disordered class and of a regular class as mentioned hereinabove, obtained using an entropy criterion such as an histogram of the angular distribution of the similarity vectors in a vicinity 1×5 about each similarity vector (herein the two similarity vectors aligned on either side of the similarity vector considered, except edge effect). The trigonometric circle is separated into 8 angular sectors of 45 degrees each, and the distribution is analysed according to whether the angles of the similarity vectors of the vicinity belong to such or such angular sector. As a threshold, it is considered that, if at least three sectors over the 8 available are activated for a same vicinity, then the central vector must belong to the disordered class; otherwise, it will belong to the ordered class of similarity vectors.

Figure 8:
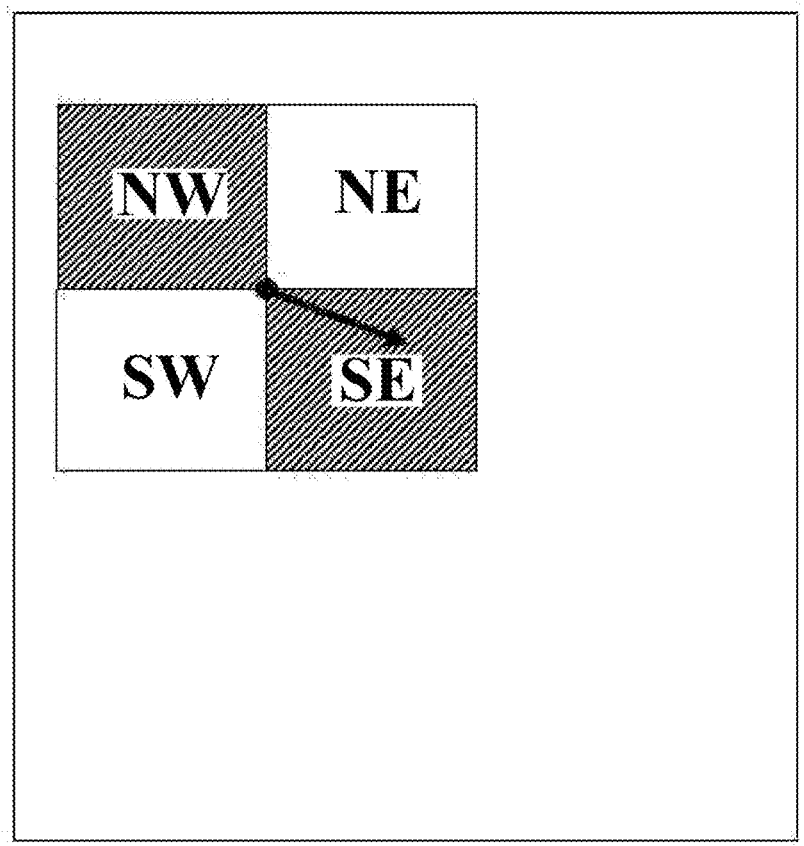
FIG. 8 shows a method of binary or quaternary coding of a similarity vector of a relational imprint.

FIG. 8 shows a method of binary or quaternary coding of a similarity vector of the relational imprint. According to the orientation of the similarity vector, in quaternary coding, it will be given the value of the compass rose North-West, South-West, North-East or South-East. In binary, it will be considered that a vector oriented North-West or South-East, indifferently, will take the value "1", and if oriented North-East or South-West, indifferently, it will take the value "0", or the reverse.

Figure 9:
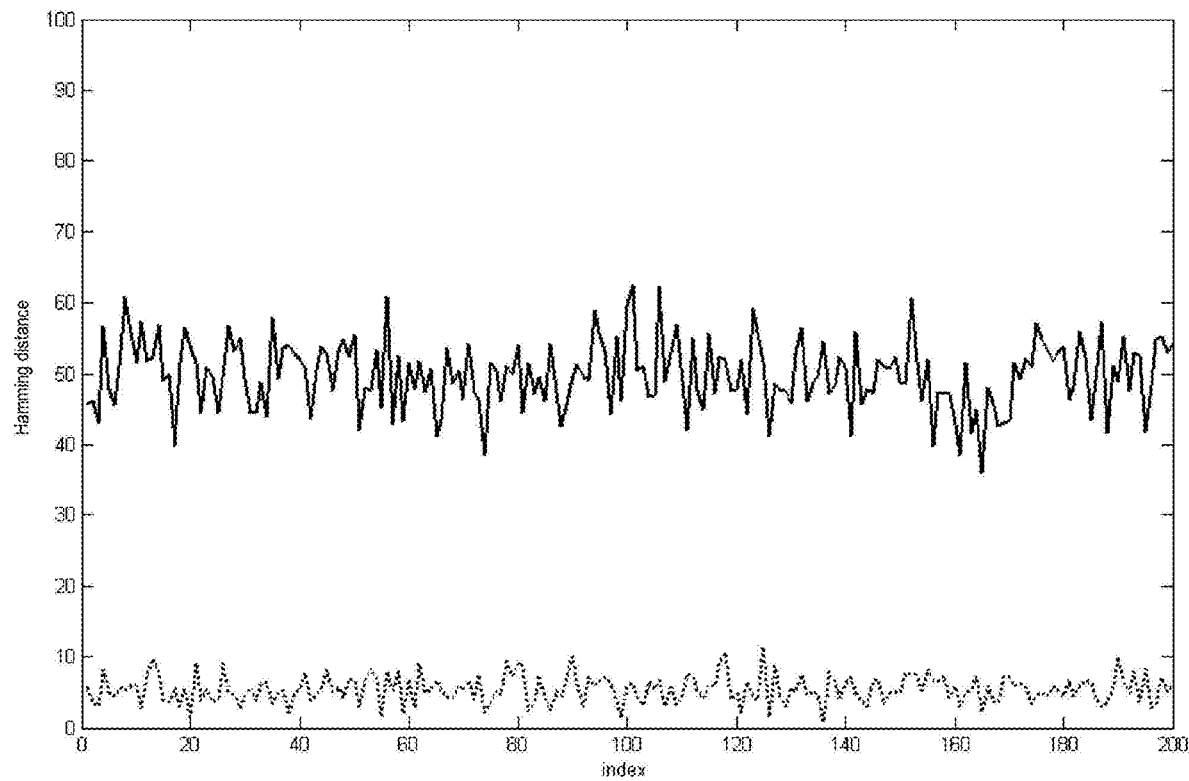
FIG. 9 shows statistic results obtained by binary coding of relational imprints hence forming relational imprints.
Figure 9:
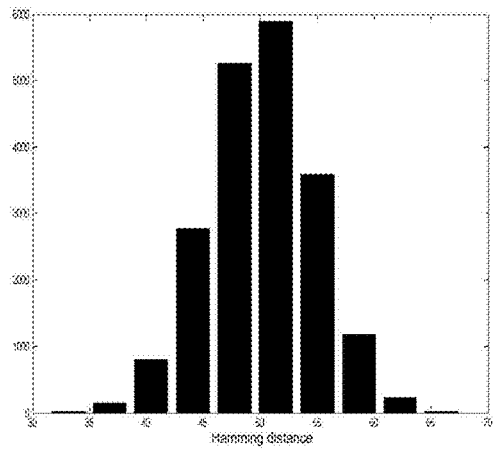
Figure 9:
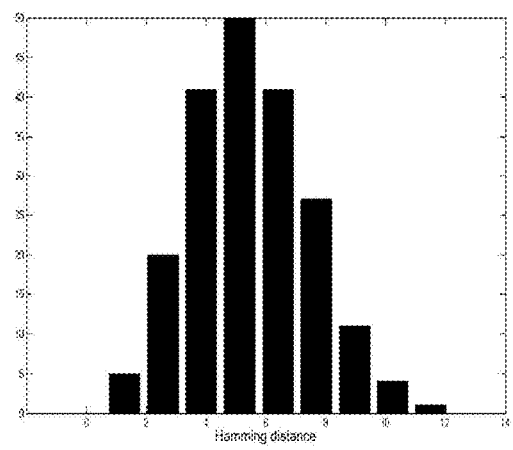

FIG. 9 shows statistic results obtained by binary coding of relational imprints hence forming relational signatures.

To establish these results, the relational imprints of 200 paper sheets belonging to a same ream have been imaged on an element of the order of one $cm^2$. Each of the relational imprints is formed of a field of similarity vectors at rank 1, calculated by correlation between successive reference tiles and inspection portions of 64×64 pixels, according to a regular grid of nodes of pitch 24×24 pixels, between a centred subject image normalized by its standard deviation and the ones complement image as the reference image (inversion of the subject image in the sense of the analysis of images). For each relational imprint, the 11×15 similarity vectors are subjected to a binary coding as described hereinabove, the 165 resulting bits being concatenated to form the relational signature.

The graph 9-A represents the Hamming distance calculated over 200 pairs of relational signatures (of 165 bits each), deduced from acquisitions of the same paper elements (dotted lines), and the Hamming distance calculated over 200 pairs of relational signatures (of 165 bits each), deduced from acquisitions of different paper elements (in full line). The graph 9-B shows the histogram of the Hamming distances between relational signatures deduced from acquisitions of different paper elements. The mean distance is of (49.99+/−4.66) %. These statistics demonstrate the good potential discrimination of different or identical paper elements by the method proposed.

The graph 9-C shows the histogram of the Hamming distances between relational signatures deduced from acquisitions of same paper elements. The mean distance is of (45+1-1.97) %.

Figure 10:
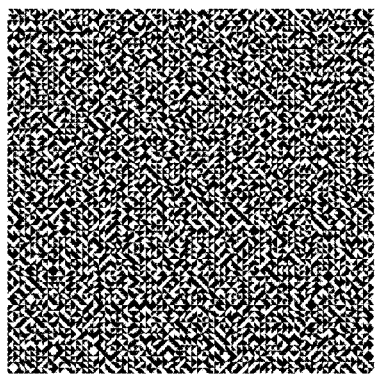
FIG. 10 shows a quaternary coding according to the compass rose of a relation imprint according to the invention, FIG. 11 explains a scheme of visual cryptography type constructed from a relational signature according to the invention.

FIG. 10 shows a quaternary coding according to the compass rose of a relational imprint of a subject image in relation to a reference image, by bijectively associating oriented isosceles triangle with the directions SW, SE, NE, NW of the compass rose.

Figure 11:
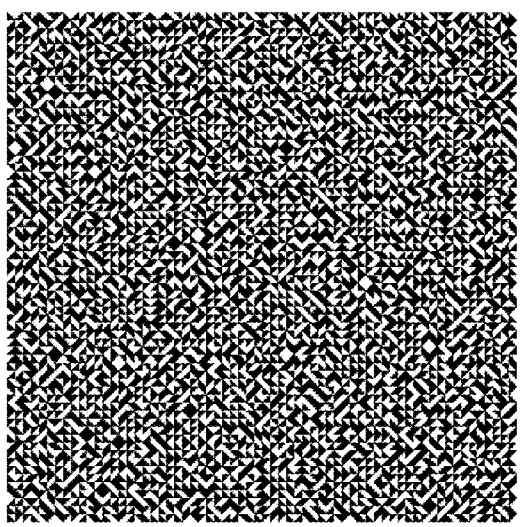
Figure 11:
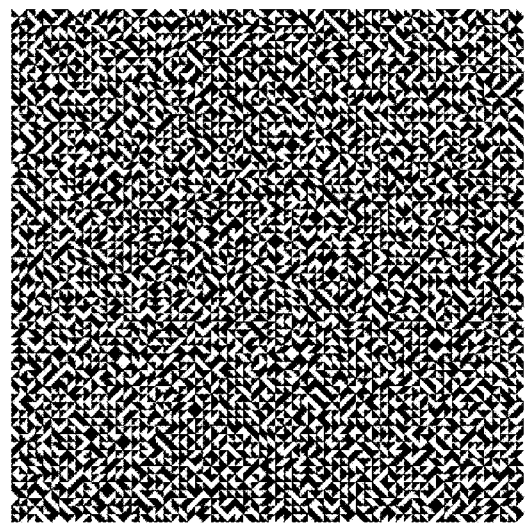
Figure 11:
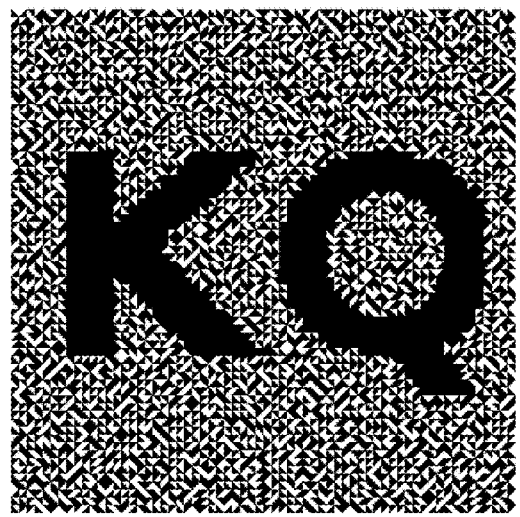

FIG. 11 explains a scheme of the visual cryptography type constructed based on a quaternary relational signature. Construction of a shared image 211-B of the type visual cryptography of a (binary) message image from the relational signature of the preceding FIG. 11-A likened to a shared image 1, as follows: if the value of the current bit of the (binary) message is 1 (resp. 0), the corresponding triangle in the image 2 is chosen so as to form a square (resp. a triangle) by being joined to the current triangle of the shared image 1.

The image resulting from the superimposition/stacking of the two preceding shared images reveals the message 11-C.

Figure 12:
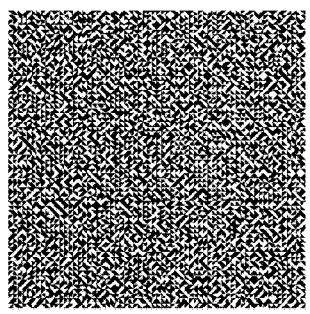
FIG. 12 shows another scheme of visual cryptography type with an image for integrity verification by a trusted third-party based on a quaternary relational signature.
Figure 12:
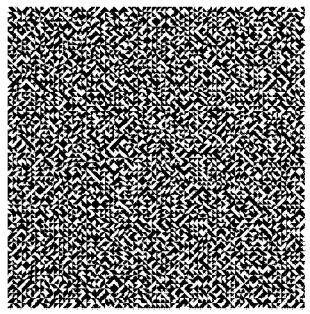
Figure 12:
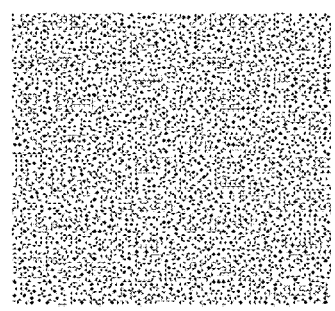
Figure 12:
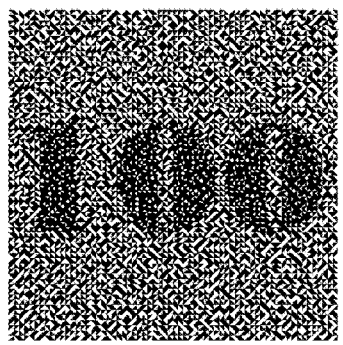
Figure 12:
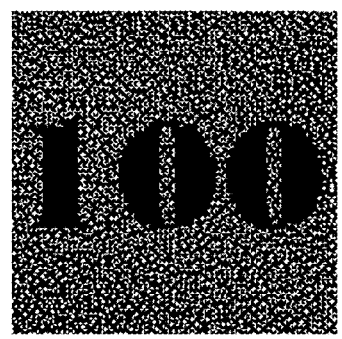
Figure 12:
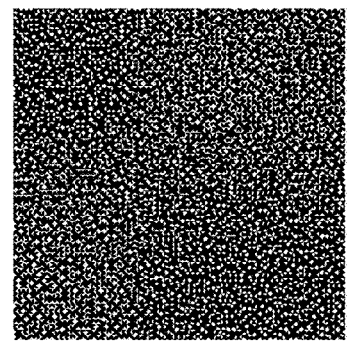
Figure 12:
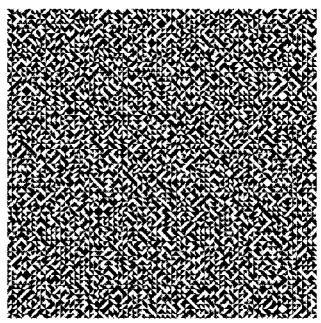
Figure 12:
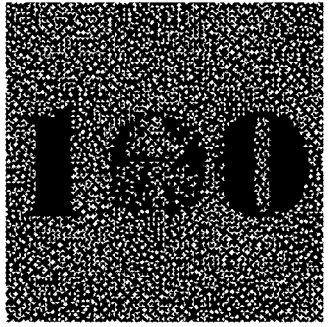
Figure 12:
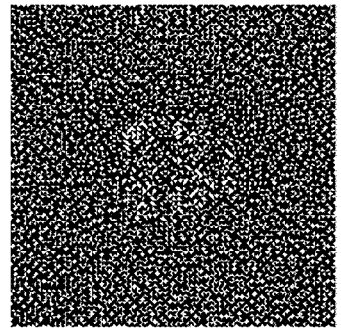
Figure 12:
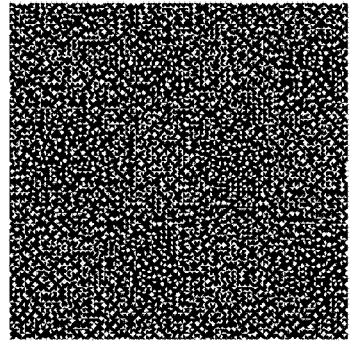

FIG. 12 shows another scheme of visual cryptography type, with an integrity verification image by a trusted third-party from a quaternary relational signature.

The thumbnail 12-A shows the relational signature serving as a shared image 1. The thumbnail 12-B shows the shared image 2. The thumbnail 12-C is the integrity verification image (held by a trusted third-party). The thumbnail 12-D corresponds to the image after superimposition of the shared images 1 and 2, the thumbnail 12-E to the image after superimposition of the verification image and of the shared images 1 and 2. The thumbnail 12-F shows the image after superimposition of the verification image and of the shared image 2. The thumbnail 12-G shows the result in case of fraudulent handling of the shared image 2 (changing of a "0" into a "8" . . . in lieu of . . . ). The thumbnail 12-H shows the image after superimposition of the verification image and of the attacked shared images 1 and 2, 12-I the image after superimposition of the verification image and of the attacked shared image 2: anomalies are seen where the attack occurred. The thumbnail 12-J is the image after superimposition of the verification image and of the non-attacked shared image 1: no anomaly is seen in the whole image.

Figure 13:
FIG. 13 shows two cases of relational stimulus (herein visual) resulting from the cognitive conditioning of a relational imprint according to the invention.
Figure 13:
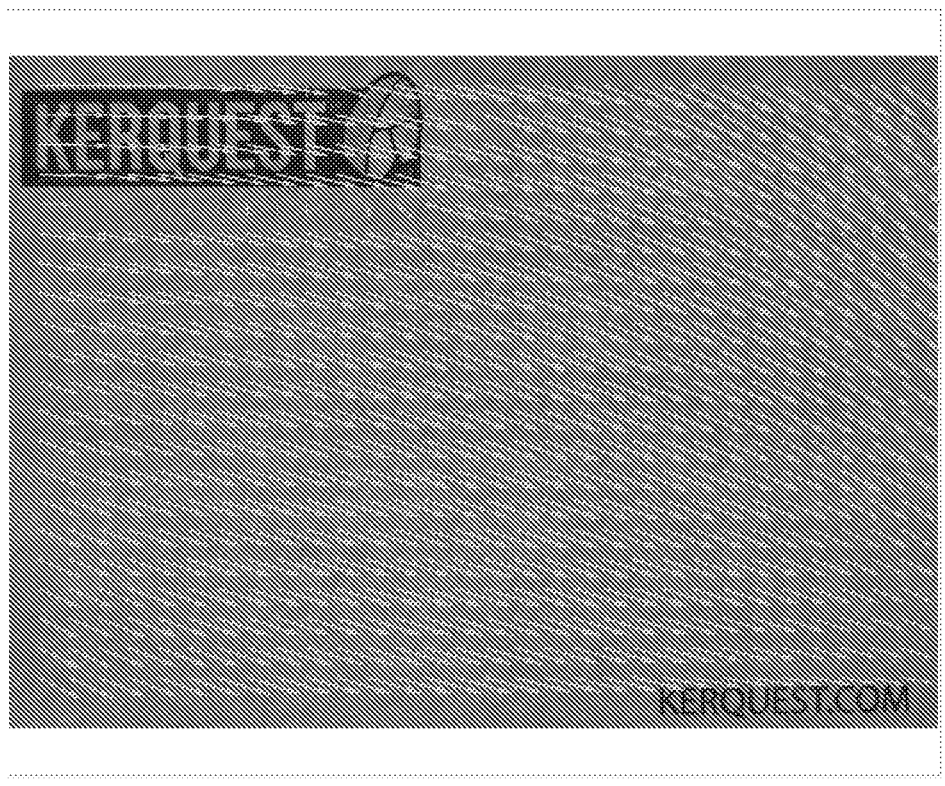

FIG. 13 shows two cases of relational stimulus (herein visual) resulting from the cognitive conditioning of the relational imprint.

The image 13-A shows a visual relational stimulus as a graph of arrows of the disordered and regular classes of the relational imprint of the image of a paper document with a printed pattern in relation to the image of a different paper document but with a same printed pattern (relational imprint of a field of imprint vectors calculated using as a similarity indicator the inter-correlation at rank 1, the reference points being the nodes of a regular grid). This shows a disordered region, i.e. a region in which the similarity vectors are disordered. This region corresponds to the region in which only the microstructure of the paper is visible on the two samples. Two regular regions comprising regular similarity vectors appear on the printed zones, at the top left and the bottom right of the image. If one of the two samples is authentic, then the printed pattern is authenticated on the one hand on the second one (to within the modulations by the material), but not the microstructures of the second one, hence it is a candidate that is different from the authentic one from the point of view of the constitutive material. The support image in this case is one of the two samples implemented in the method.

The image 13-B also shows graphically a visual relational stimulus, but between two acquisitions of a same paper document with a printed pattern. This shows regular similarity vectors, between two identical images (to within the distortions induced by the measurement taking (manual in this case)) of a same paper sample. If one of the two samples is authentic, then the printed pattern is authenticated on the second one, but also the microstructures of the second one, hence it is the authentic one from the point of view of the constituent material.

Figure 14:
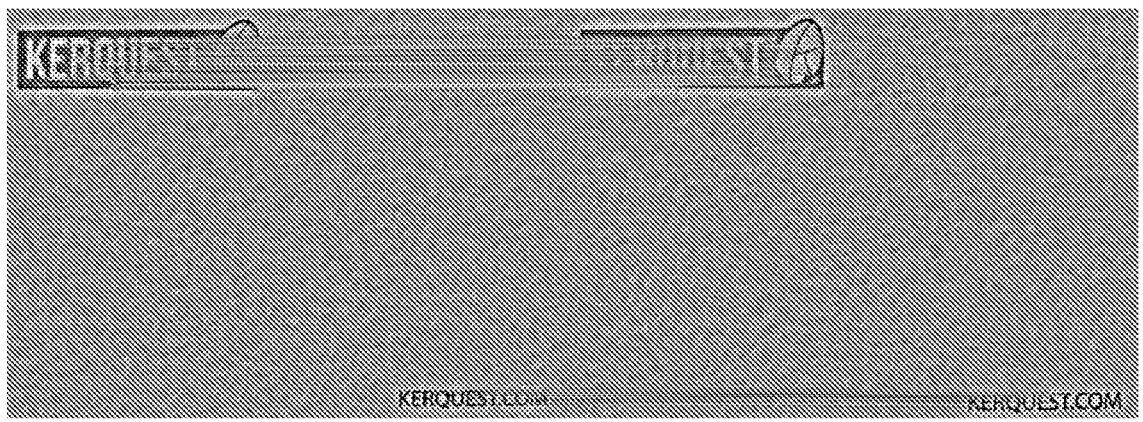
FIG. 14 shows another type of relational stimulus as a graph of coloured segments.
Figure 14:
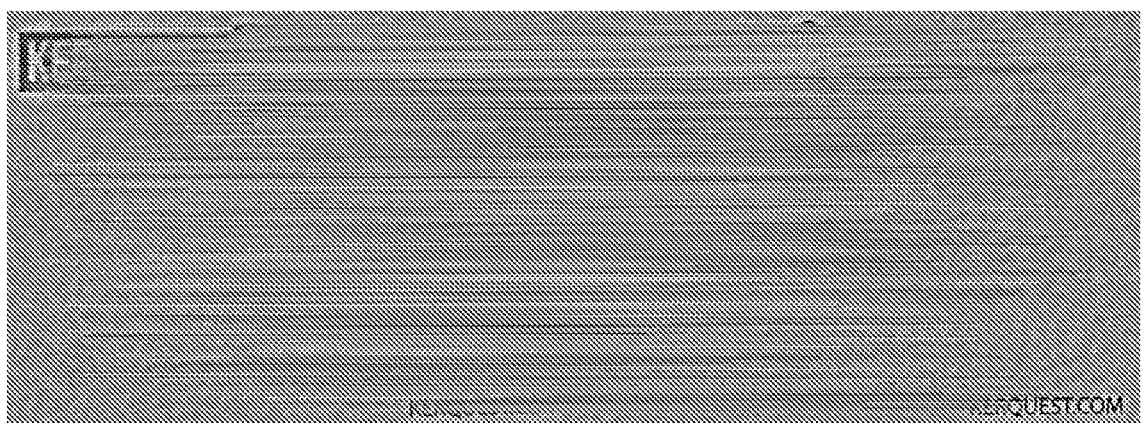

FIG. 14 shows another type of relational stimulus as a graph of coloured or grey-level segments. The image 14-A shows a representation of similarity vectors of the relational imprint of the image of a paper document with a printed pattern in relation to the image of a different paper document but with a same printed pattern (relational imprint of a field of imprint vectors calculated using as a similarity indicator the detector/descriptor A-KAZE, after band-pass filtering of the images). Each of the segments of the cognitive conditioning join a characteristic reference point detected in the subject image to its counterpart in the reference image of the image obtained by concatenating the two preceding images. This shows that, in this other form of representation, two different samples produce connexions between similar points only in the printed zones at the top left and bottom right of the image, and on the contrary, nothing at the location where only the microstructure of the paper is visible on the two samples. The support image is in this case a juxtaposition of the samples.

The image 14-B shows a similar representation but between two acquisitions of a same paper document with a printed pattern. This shows that two identical samples produce connections between similar points that are distributed over the whole of the samples (printed portion and portion coming from the microstructure) and in a very great number with respect to the preceding case (of the order of 10 to 20 times more than previously).

Figure 15:
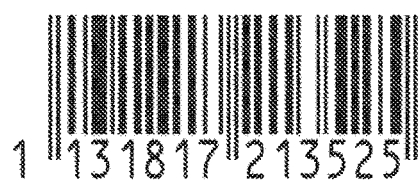
FIG. 15 shows an application for checking the integrity of a printed pattern.
Figure 15:
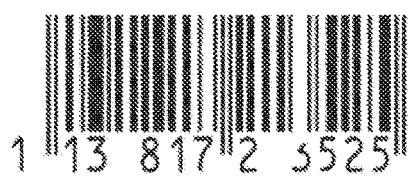
Figure 15:

FIG. 15 shows an application for checking the integrity of a printed pattern. In this checking, the visual display of the relational imprint indicates zones of non-similarity translated by the dominant local occurrence of disordered similarity vectors. The relational imprint has been obtained using as a similarity indicator the inter-correlation and the rank 1, the reference points coming from a regular grid. The support image in this case is the original image implemented in the method. According to this application, the thumbnail 15-A corresponds to the original image, the thumbnail 15-B represents the modified image, whereas the thumbnail 15-C is a visual display of the relational imprint resulting from the comparison of these two images.

Figure 16:
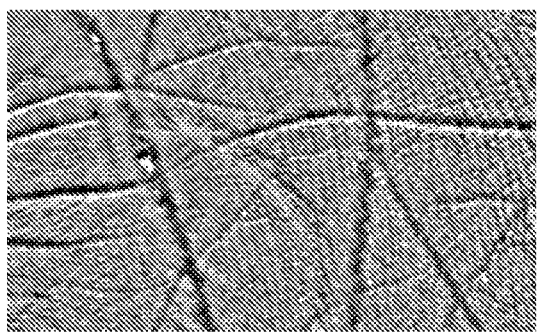
FIG. 16 shows a mode of biometric authentication by the visual display of the relational imprint between two different skin imprint acquisitions.
Figure 16:
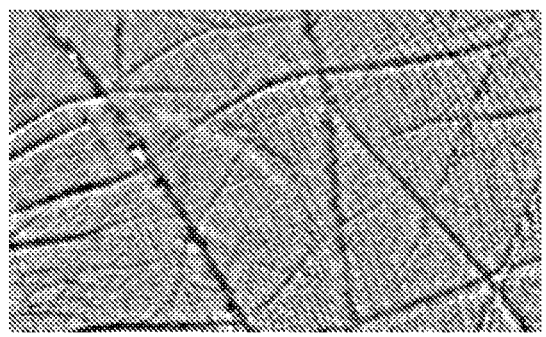
Figure 16:
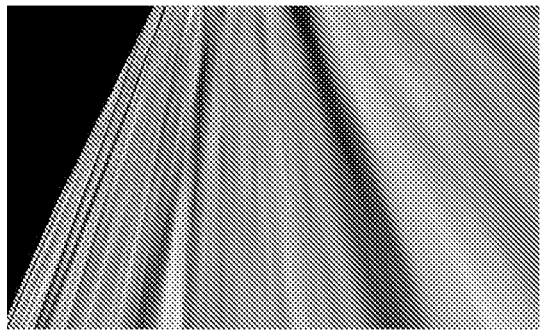
Figure 16:
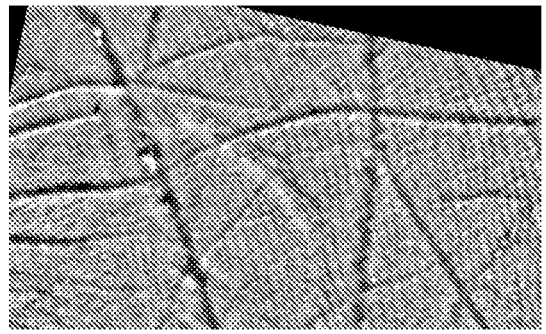
Figure 16:
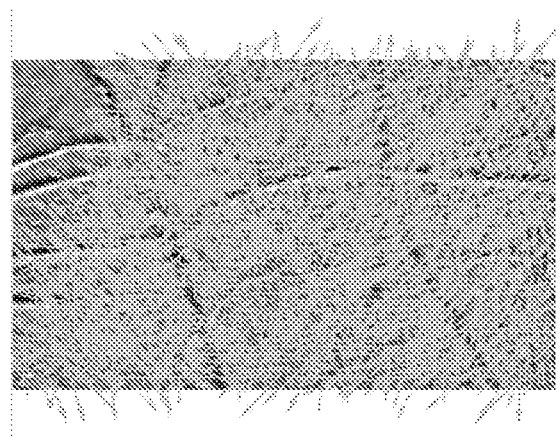
Figure 16:
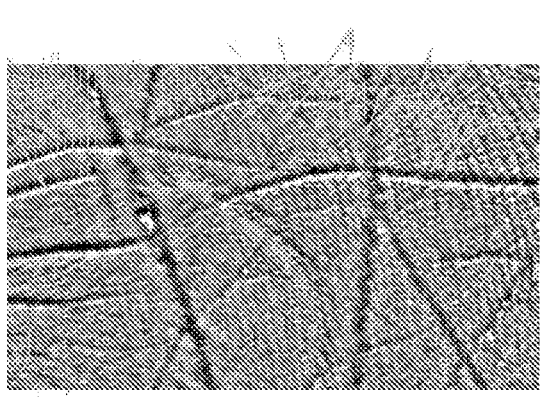

FIG. 16 shows a mode of biometric authentication by the visual display of the relational imprint between two acquisitions of different skin imprints and an authentic reference acquisition. The latter has been obtained using as a similarity indicator the inter-correlation and the rank 1, the reference points coming from a regular grid, and a registration by a detector/descriptor method of the candidate images with respect to the original image is performed before the calculation of the similarity vectors.

This shows that two different imprints produce a widely disordered field of similarity vectors (on the left, case candidate image 2 vs original image) whereas regular and small-size fields of similarity vectors appear (on the right, case candidate image 1 vs original image) when two imprints have a common authentication region. It is to be noted that the frontier between the grey zones and the black zones of the registered images also appears on these similarity vectors, just like what has been said in the integrity checking application. The support image is in this case the original image implemented in the method.

It is to be noted that the "registered" image could be a pertinent visual representation in the sense of the invention in that it is no longer comparable to an image of the skin type in the case 2, whereas the characteristic fingerprint microtexture is always recognized in the acquisition 1.

In FIG. 16, the thumbnail 16-A shows the original authentic image, the thumbnail 16-B represents the raw candidate image 1, the thumbnail 16-C shows the "registered" candidate image 2, the thumbnail 16-D corresponds to the registered candidate image 1, the thumbnail 16-E is a visual display of the image 2 compared with the original image, whereas the thumbnail 16-F is a visual display of the image 1 compared with the original image.

Figure 17:
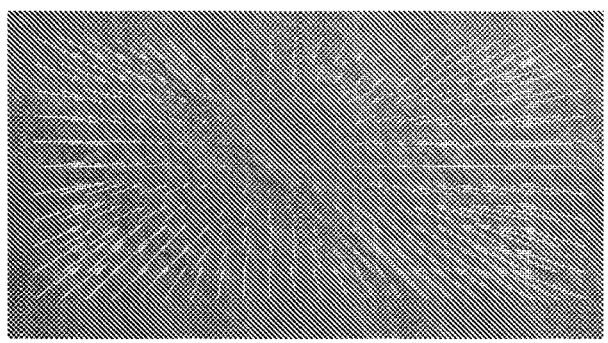
FIG. 17 shows examples of relative transformations applied to one of two acquisitions of a same material subject.
Figure 17:
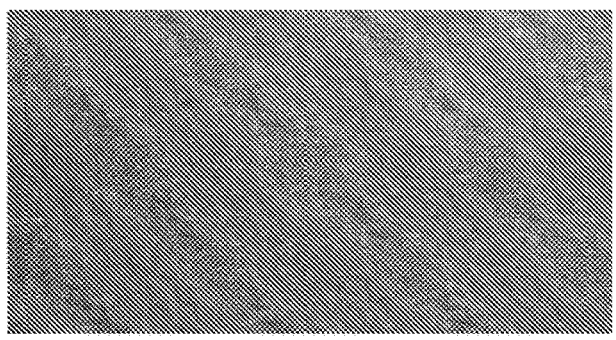
Figure 17:
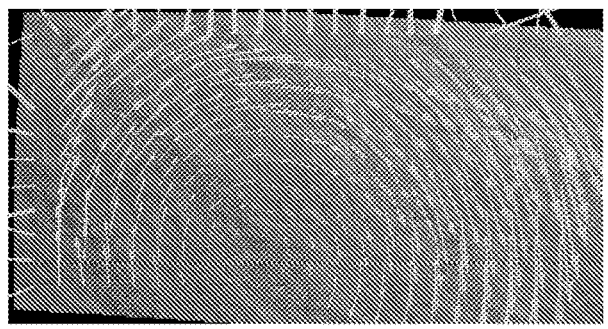
Figure 17:
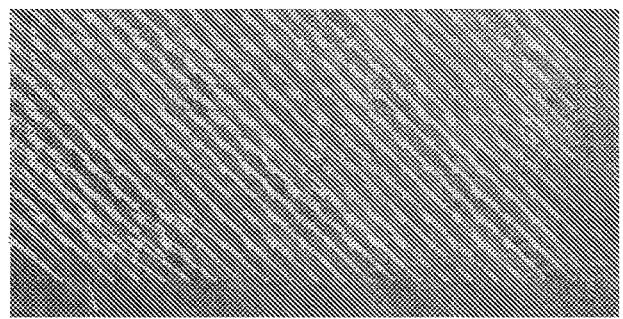

FIG. 17 shows examples of relative transformations applied to one of the two acquisitions of a same material subject, showing widely regular figures of fields of similarity vectors and showing the possibilities of implementation in real time if a user acts on a touch screen at the same time as the calculations and the visual displays. The thumbnails respectively show:

17-A an expansion by 5%,
17-B a registration (quasi-null transformation)
17-C a rotation by 5° combined with a translation
17-D a simple translation.

The invention claimed is:

1. A method for determining a relational imprint between two images, the method comprising:
   obtaining an image of a material subject and a selected reference image different from the material subject image;
   calculating vectors of similarity between tiles belonging to the material subject image and the selected reference image, respectively, by a similarity indicator and a similarity rank, the similarity indicator and the similarity rank being selected to obtain a field of imprint vectors, formed by the vectors of similarity, the field of imprint vectors comprising at least one disordered region in the sense of an entropy criterion; and
   recording as a relational imprint a representation of the at least one disordered region of the obtained field of imprint vectors.

2. The method according to claim 1, wherein the calculating the similarity vectors comprises:
   determining a mark common to the material subject image and the selected reference image,
   determining, in one of the material subject image and the selected reference image, a set of reference tiles each associated with at least one reference point having coordinates in a common reference system,
   searching, in the other one of the material subject image and the selected reference image, for concordance tiles that are each matched with a reference tile with which the respective concordance tiles have a degree of similarity and are each associated with at least one reference point having coordinates in the common reference system, and
   calculating coordinates of each of the similarity vectors based on coordinates of reference points of each of the reference tiles and each of the associated concordance tiles.

3. The method according to claim 2, wherein the reference tiles are predetermined based on a specific grid of reference tiles.

4. The method according to claim 2, wherein the searching for the concordance tiles uses, for each of the reference tiles, calculating a series of similarity indices between the portion of the one image corresponding to said respective reference tile and an inspection portion of the other image, the inspection portion being displaced in the other image for calculating each similarity index and by selecting as a concordance tile associated with said respective reference tile, the inspection portion having a specific degree of similarity with said reference tile.

5. The method according to claim 2, wherein the searching for concordance tiles comprises:
   determining, for the other image, a set of inspection tiles, for each of the reference tiles:
      calculating a series of similarity indices, each similarity index being calculated between the portion of the one image corresponding to said reference tile and the portion of the other image corresponding to an inspection tile, the inspection tile being different for each calculation of similarity index, and
      selecting, as one of the concordance tiles associated with said reference tile, the inspection tile having a specific degree of similarity with said reference tile.

6. The method according to claim 5, wherein the determining the sets of reference and inspection tiles is performed by implementing a characteristic detection and description algorithm.

7. The method according to claim 1, wherein the similarity vectors are calculated in the plane or a two-dimensional space.

8. The method according to claim 1, further comprising, before calculating the similarity vectors, transforming one or more of the one image and the other image.

9. The method according to claim 8, wherein the transforming is a registration.

10. The method according to claim 1, further comprising, before the calculating the similarity vectors, determining one of at least of the following parameters:
  size, shape, position of one or more of the reference tiles and the concordance tiles, order of use of the one image and the other image, and
  size and shape of an evaluation window to determine an existence of a disordered region.

11. The method according to claim 1, wherein the calculating the field of imprint vectors comprises:
  calculating a plurality of fields of intermediate similarity vectors between one of the two images and the other image having undergone a transformation that is different from an intermediate similarity vector to the other, and
  comparing the fields of intermediate similarity vectors between each other and keeping, as a field of imprint similarity vectors, the field of intermediate similarity vectors having a similarity optimum, maximum or minimum.

12. The method according to claim 1, further comprising, before the recording, decomposing the field of similarity vectors into at least one regular portion and one disordered portion including allocating each of the similarity vectors to either one of the regular and disordered portions according to a regional entropy criterion.

13. The method according to claim 12, wherein, when a local similarity optimum is selected at an order equal to one, for a local rank, the respective similarity vector is added either into the disordered component of the field of imprint vector, or into the regular component of the field of imprint vectors, according to whether or not the respective similarity vector fulfills the regional entropy criterion, the null vector then being added into the regular component, or into the disordered component, respectively.

14. The method according to claim 1 further comprising compressing the field of imprint vectors and recording a compression result as a relational imprint.

15. The method according to claim 1, further comprising using, as a relative or relational signature of the material subject image with respect to the reference image, a digital representation of the relational imprint.

16. The method according to claim 1, wherein the recording the relational imprint is associated with the recording of at least one of the images used.

17. The method according to claim 1, further comprising one of visually, sonorously, and tactily representing the relational imprint.

18. The method according to claim 2, wherein the reference tiles are predetermined based on a set of distinct unitary tiles, of regular or non-regular shape, size and position, with or without overlapping.

19. The method according to claim 2, wherein the reference tiles are auto-adaptively predetermined by implementing an algorithm of characteristic detection and description.

20. The method according to claim 5, wherein the degree of similarity corresponds to the similarity rank of the inspection tile retained as the concordance tile in the set of inspection tiles.

21. The method according to claim 15, wherein the relational signature is recorded for later use.

22. The method according to claim 15, further comprising:
  calculating a first relational imprint of the material subject image with respect to the reference image, a registration of the material subject image with respect to the reference image being based on the first relation imprint; and
  subsequently calculating a second relational imprint of the registered material subject image with respect to the reference image, the second relation imprint being used for determining the relational signature.

23. The method according to claim 15, further comprising:
  calculating a first relational imprint of the material subject image with respect to the reference image, a registration of the material subject image with respect to the reference image being based on the first relational imprint;
  subsequently calculating a second relational imprint of the registered material subject image with respect to the reference image, a registration of the registered material subject image with respect to the reference image being based on the second relation imprint; and
  subsequently calculating a third relational imprint of the registered material subject image with respect to the reference image, the third relation imprint being used to determine the relational signature.

24. The method according to claim 18, wherein the method used in a visual cryptography scheme.

25. The method according to claim 1, wherein the relational imprint is recorded as a list of sets of similarity vectors linked to the respective reference points, according to a class to which the sets of similarity vectors belong.

26. The method according to claim 1, further comprising using, as a relational stimulus of the material subject image with respect to the reference image, a cognitive conditioning of the relational imprint.

27. A method of unitary authentication of material subjects, each of the material subjects to be authenticated belonging to families of subjects comprising an authentication zone, with an essentially random, intrinsic continuous medium structure, a same reference image being used to authenticate a set of material subjects, the method comprising:
  determining, for each of the material subjects, a relational imprint between the reference image and at least one image of an authentication zone of the material subject according to the method of claim 1;
  determining, from each of the relational imprints, a relational signature;
  recording the relational signature in association with the reference image, as a set of authentic relational signatures;
  authenticating a candidate material subject comprising:
    determining, for a relational imprint between the reference image and an image of an authentication zone of the candidate material subject according to the method of claim 1,
    determining, from the relational imprint between the reference image and the image of the authentication zone of the candidate material subject, a candidate relational signature of the candidate material subject, and
    comparing the candidate relational signature with the relational signatures of the set of authentic relational signatures and considering the candidate material subject as authentic when the candidate relational signature is similar, according to a threshold level, to one of the relational signatures of the set of the authentic relational signatures.

28. The method of unitary authentication according to claim 26, wherein the material subject image is registered with respect to the reference image.

29. The method of unitary authentication according to claim 24, wherein a position of the authentication zone on the material subjects is recorded.

30. The method of unitary authentication according to claim 24, wherein images of the material subjects are recorded.

31. The method of unitary authentication according to claim 24, wherein each of the relational signatures is recorded in association with the respective image of the corresponding material subject, and after the authenticating, the recorded image corresponding to the relational signature of the authenticated material subject is compared to the candidate image of the material subject in order to check integrity.

32. The method of unitary authentication according to claim 24, where the authenticating of the candidate subject is conducted using an electronic device comprising a visualization touch screen and being configured to allow a modification of visualization magnification of the images and/or displacement of said images by the displacement of two points of contact on the touch screen.

\* \* \* \* \*

UNITED STATES PATENT AND TRADEMARK OFFICE
CERTIFICATE OF CORRECTION

PATENT NO. : 10,990,845 B2
APPLICATION NO. : 16/302255
DATED : April 27, 2021
INVENTOR(S) : Yann Boutant et al.

It is certified that error appears in the above-identified patent and that said Letters Patent is hereby corrected as shown below:

In the Claims

Column 27, Lines 6-30, should read as follows:
-- 28. The method of unitary authentication according to claim 27, wherein the material subject image is registered with respect to the reference image.
29. The method of unitary authentication according to claim 27, wherein a position of the authentication zone on the material subjects is recorded.
30. The method of unitary authentication according to claim 27, wherein images of the material subjects are recorded.
31. The method of unitary authentication according to claim 27, wherein each of the relational signatures is recorded in association with the respective image of the corresponding material subject, and after the authenticating, the recorded image corresponding to the relational signature of the authenticated material subject is compared to the candidate image of the material subject in order to check integrity.
32. The method of unitary authentication according to claim 27, where the authenticating of the candidate subject is conducted using an electronic device comprising a visualization touch screen and being configured to allow a modification of visualization magnification of the images and/or displacement of said images by the displacement of two points of contact on the touch screen. --

Signed and Sealed this
Thirty-first Day of May, 2022

*Katherine Kelly Vidal*
Katherine Kelly Vidal
*Director of the United States Patent and Trademark Office*